US009535182B2

(12) United States Patent
Gagliardi et al.

(10) Patent No.: US 9,535,182 B2
(45) Date of Patent: Jan. 3, 2017

(54) MARINE SEISMIC SURVEYING WITH TOWED COMPONENTS BELOW WATER SURFACE

(71) Applicant: ION Geophysical Corporation, Houston, TX (US)

(72) Inventors: Joseph R. Gagliardi, Katy, TX (US); Shawn Rice, Spring, TX (US); Timothy A. Dudley, Houston, TX (US); Curt Schneider, Houston, TX (US)

(73) Assignee: ION Geophysical Corporation, Houston, TX (US)

( * ) Notice: Subject to any disclaimer, the term of this patent is extended or adjusted under 35 U.S.C. 154(b) by 634 days.

(21) Appl. No.: 13/793,544

(22) Filed: Mar. 11, 2013

(65) Prior Publication Data

US 2013/0182531 A1 Jul. 18, 2013

Related U.S. Application Data

(63) Continuation-in-part of application No. 12/719,783, filed on Mar. 8, 2010, now Pat. No. 8,593,905.
(Continued)

(51) Int. Cl.
*G01V 1/38* (2006.01)
*G01V 1/16* (2006.01)

(52) U.S. Cl.
CPC ............... *G01V 1/3835* (2013.01); *G01V 1/16* (2013.01); *G01V 1/3826* (2013.01)

(58) Field of Classification Search
CPC ............ B63B 2021/66; B63B 2205/00; B63B 2205/02; B63B 2205/08; B63B 3/38; B63B 35/08; G01V 1/3843
(Continued)

(56) References Cited

U.S. PATENT DOCUMENTS 644,943 A * 3/1900 Pino .............................. 405/190
1,120,621 A * 12/1914 Landmark .................... 102/414
(Continued)

FOREIGN PATENT DOCUMENTS

EP 0154968 9/1985
FR 2496277 6/1982
(Continued)

OTHER PUBLICATIONS

Wikipedia contributors. Pendulum-and-hydrostat control. Wikipedia, The Free Encyclopedia. Nov. 9, 2009. Available at: http://en.wikipedia.org/w/index.php?title=Pendulum-and-hydrostat_control&oldid=324922776. Accessed Jun. 8, 2015.*
(Continued)

*Primary Examiner* — Isam Alsomiri
*Assistant Examiner* — Amienatta M Ndure Jobe
(74) *Attorney, Agent, or Firm* — Blank Rome LLP

(57) ABSTRACT

A skeg mounts from the stern of a towing vessel and extends below the waterline. A channel in the skeg protects cables for steamers and a source (e.g., air gun array) of a seismic system deployed from the vessel. Tow points on the skeg lie below the water's surface and connect to towlines to support the steamers and the source. A floatation device supports the source and tows below the water's surface to avoid ice floes or other issues encountered at the water's surface. The floatation device has a depth controlled float and one or more adjustable buoyancy floats. The controlled float has its buoyancy controlled with pressurized gas used for the air gun source and actively controls the depth of air gun source in the water. Each of the adjustable float connects in line with the controlled float with flexible connections. Each adjustable float has its buoyancy preconfigured to counterbalance the weight in water of the air gun or portion of the source that the float supports.

30 Claims, 31 Drawing Sheets

Related U.S. Application Data

(60) Provisional application No. 61/158,698, filed on Mar. 9, 2009, provisional application No. 61/246,367, filed on Sep. 28, 2009, provisional application No. 61/261,329, filed on Nov. 14, 2009.

(58) Field of Classification Search
USPC ....... 367/106, 130, 154; 174/101.5; 114/322
See application file for complete search history.

(56) References Cited

U.S. PATENT DOCUMENTS

| | | | |
|---|---|---|---|
| 1,625,245 A | 4/1927 | Grove | |
| 1,690,578 A | 11/1928 | Hammond, Jr. | |
| 2,030,768 A | 2/1936 | Shultz | |
| 2,062,423 A * | 12/1936 | Mingus | E03F 5/042 137/398 |
| 2,462,568 A | 2/1949 | Steckel | |
| 2,465,696 A * | 3/1949 | Paslay | 367/23 |
| 2,556,423 A | 6/1951 | Gross | |
| 2,566,029 A | 8/1951 | Louthan | |
| 2,692,570 A * | 10/1954 | Costa | 114/77 A |
| 2,765,565 A | 10/1956 | Mussio | |
| 3,034,471 A | 5/1962 | Aschinger | |
| 3,159,806 A | 12/1964 | Piasecki | |
| 3,172,510 A | 3/1965 | Lee et al. | |
| 3,290,645 A * | 12/1966 | Pavey, Jr. et al. | 367/24 |
| 3,336,572 A | 8/1967 | Paull et al. | |
| 3,347,197 A * | 10/1967 | Scherer | B63H 11/08 114/278 |
| 3,354,658 A | 11/1967 | Sam | |
| 3,354,984 A * | 11/1967 | Pavey, Jr. | 367/154 |
| 3,412,704 A * | 11/1968 | Buller et al. | 114/245 |
| 3,437,987 A | 4/1969 | Burg | |
| 3,497,869 A | 2/1970 | Silverman | |
| 3,583,445 A | 6/1971 | Harbonn et al. | |
| 3,605,668 A | 9/1971 | Morgan | |
| 3,621,380 A | 11/1971 | Barlow, Jr. | |
| 3,635,186 A | 1/1972 | German | |
| 3,648,642 A * | 3/1972 | Fetrow et al. | 114/245 |
| 3,703,876 A | 11/1972 | Michelsen | |
| 3,739,736 A | 6/1973 | Carreau et al. | |
| 3,744,014 A | 7/1973 | Greenlaw | |
| 3,810,081 A | 5/1974 | Rininger | |
| 3,842,770 A * | 10/1974 | Hedbawny et al. | 114/20.3 |
| 3,886,882 A | 6/1975 | Thornburg et al. | |
| 3,935,829 A | 2/1976 | Lantz | |
| 3,943,483 A * | 3/1976 | Strange | 367/17 |
| 3,987,745 A * | 10/1976 | Chaverebiere de Sal et al. | 114/245 |
| 4,004,265 A | 1/1977 | Woodruff et al. | |
| 4,027,616 A * | 6/1977 | Guenther et al. | 114/244 |
| 4,033,277 A * | 7/1977 | Schaper | 114/230.23 |
| 4,037,189 A | 7/1977 | Bell et al. | |
| 4,047,579 A | 9/1977 | Wilckens et al. | |
| 4,124,990 A | 11/1978 | Bell et al. | |
| 4,139,074 A | 2/1979 | White | |
| 4,189,703 A | 2/1980 | Bennett | |
| 4,196,688 A | 4/1980 | Lipinsky, Sr. | |
| 4,231,111 A | 10/1980 | Neeley | |
| 4,276,845 A * | 7/1981 | Spanner | 114/42 |
| 4,290,123 A | 9/1981 | Pickens | |
| 4,313,181 A | 1/1982 | Holm | |
| 4,314,363 A | 2/1982 | Thigpen et al. | |
| 4,354,446 A | 10/1982 | Goldsmith et al. | |
| 4,372,420 A | 2/1983 | White | |
| 4,404,664 A | 9/1983 | Zachariadis | |
| 4,520,468 A | 5/1985 | Scherbatskoy | |
| 4,566,083 A | 1/1986 | Thigpen | |
| 4,570,245 A | 2/1986 | Thigpen | |
| 4,581,723 A | 4/1986 | Savit | |
| 4,616,348 A | 10/1986 | Ostrander | |
| 4,616,590 A | 10/1986 | Albertini et al. | |
| 4,621,347 A | 11/1986 | Ostrander | |
| 4,648,083 A | 3/1987 | Giallorenzi | |
| 4,719,987 A | 1/1988 | George, Jr. et al. | |
| 4,729,333 A | 3/1988 | Kirby et al. | |
| 4,756,268 A * | 7/1988 | Gjestrum et al. | 114/242 |
| 4,775,028 A | 10/1988 | de Heering | |
| 4,798,156 A | 1/1989 | Langeland et al. | |
| 4,800,831 A | 1/1989 | Hellmann et al. | |
| 4,870,626 A | 9/1989 | Tveit | |
| 4,890,568 A * | 1/1990 | Dolengowski | 114/246 |
| 4,992,991 A | 2/1991 | Young et al. | |
| 4,998,227 A | 3/1991 | Rygg et al. | |
| 5,046,055 A | 9/1991 | Ruffa | |
| 5,097,788 A | 3/1992 | Castel | |
| 5,113,376 A | 5/1992 | Bjerkoy | |
| 5,142,505 A | 8/1992 | Peynaud | |
| 5,144,588 A * | 9/1992 | Johnston et al. | 367/16 |
| 5,157,636 A * | 10/1992 | Bjerkoy | 367/15 |
| 5,263,431 A | 11/1993 | Wood | |
| 5,305,703 A | 4/1994 | Korsgaard | |
| 5,353,223 A | 10/1994 | Norton et al. | |
| 5,408,441 A | 4/1995 | Barr et al. | |
| 5,532,975 A * | 7/1996 | Elholm | 367/16 |
| 5,546,882 A * | 8/1996 | Kuche | 114/244 |
| 5,666,900 A | 9/1997 | Carroll et al. | |
| 5,676,083 A | 10/1997 | Korsgaard | |
| 5,841,733 A | 11/1998 | Bouyoucos et al. | |
| 5,941,746 A | 8/1999 | Isnard et al. | |
| 6,002,648 A * | 12/1999 | Ambs | 367/159 |
| 6,012,406 A | 1/2000 | Dudley et al. | |
| 6,021,577 A | 2/2000 | Shiells et al. | |
| 6,046,959 A | 4/2000 | Salmi et al. | |
| 6,058,072 A | 5/2000 | Abraham | |
| 6,088,296 A | 7/2000 | Seaman et al. | |
| 6,111,817 A * | 8/2000 | Teeter | 367/13 |
| 6,189,477 B1 | 2/2001 | Cody | |
| 6,212,476 B1 | 4/2001 | Noy et al. | |
| 6,227,310 B1 | 5/2001 | Jamieson | |
| 6,230,840 B1 * | 5/2001 | Ambs | 181/113 |
| 6,467,423 B1 | 10/2002 | Poldervaart | |
| 6,474,254 B1 * | 11/2002 | Ambs et al. | 114/312 |
| 6,487,782 B1 | 12/2002 | Bond | |
| 6,493,636 B1 | 12/2002 | DeKok | |
| 6,504,792 B2 | 1/2003 | Barker | |
| 6,525,992 B1 | 2/2003 | Olivier et al. | |
| 6,532,189 B2 | 3/2003 | Barker | |
| 6,606,958 B1 * | 8/2003 | Bouyoucos | 114/242 |
| 6,683,819 B1 | 1/2004 | Estaphan et al. | |
| 6,691,038 B2 * | 2/2004 | Zajac | 702/14 |
| 6,823,262 B2 | 11/2004 | Bahorich et al. | |
| 7,042,803 B2 | 5/2006 | Kutty et al. | |
| 7,092,315 B2 | 8/2006 | Olivier | |
| 7,190,634 B2 | 3/2007 | Lambert et al. | |
| 7,206,254 B2 | 4/2007 | Oliver et al. | |
| 7,206,256 B1 | 4/2007 | Thornton et al. | |
| 7,209,408 B1 | 4/2007 | Stottlemyer et al. | |
| 7,221,623 B2 | 5/2007 | Thornton et al. | |
| 7,222,579 B2 | 5/2007 | Hillesund et al. | |
| 7,252,046 B1 | 8/2007 | Ead et al. | |
| 7,293,520 B2 | 11/2007 | Hillesund et al. | |
| 7,376,515 B2 | 5/2008 | Smith | |
| 7,423,929 B1 | 9/2008 | Olivier | |
| 7,457,193 B2 * | 11/2008 | Pramik | 367/16 |
| 7,623,411 B2 | 11/2009 | Faucheaux et al. | |
| 7,660,189 B2 | 2/2010 | Vigen et al. | |
| 8,347,801 B2 * | 1/2013 | Denise | 114/40 |
| 8,570,829 B2 * | 10/2013 | Hovland et al. | 367/16 |
| 2005/0180263 A1 * | 8/2005 | Lambert et al. | 367/128 |
| 2006/0239122 A1 | 10/2006 | Vigen et al. | |
| 2006/0256653 A1 | 11/2006 | Toennessen et al. | |
| 2006/0262647 A1 | 11/2006 | Thornton et al. | |
| 2007/0070808 A1 * | 3/2007 | Ray et al. | 367/15 |
| 2008/0019214 A1 * | 1/2008 | Pramik | 367/16 |
| 2008/0022913 A1 * | 1/2008 | Toennessen et al. | 114/245 |
| 2008/0029012 A1 * | 2/2008 | Stokkeland | 114/253 |
| 2008/0141916 A1 | 6/2008 | Bein | |
| 2008/0163504 A1 | 7/2008 | Smith et al. | |
| 2008/0223583 A1 * | 9/2008 | Roveri et al. | 166/336 |
| 2009/0141587 A1 | 6/2009 | Welker et al. | |
| 2009/0141591 A1 | 6/2009 | Basilico | |
| 2009/0161485 A1 | 6/2009 | Toennessen et al. | |

(56) References Cited

U.S. PATENT DOCUMENTS

| | | | |
|---|---|---|---|
| 2009/0262601 | A1 | 10/2009 | Hillesund et al. |
| 2009/0265111 | A1 | 10/2009 | Helwig et al. |
| 2009/0296519 | A1 | 12/2009 | Keers et al. |
| 2009/0316526 | A1* | 12/2009 | Grall .............................. 367/20 |
| 2010/0226204 | A1 | 9/2010 | Gagliardi et al. |
| 2010/0312519 | A1 | 12/2010 | Huang et al. |
| 2011/0013481 | A1 | 1/2011 | Clark |
| 2011/0158045 | A1* | 6/2011 | Karlsen et al. ................ 367/20 |

FOREIGN PATENT DOCUMENTS

| | | |
|---|---|---|
| GB | 1376513 | 12/1974 |
| GB | 1415706 | 11/1975 |
| RU | 1835938 | 4/1995 |
| RU | 1835938 A1 | 4/1995 |
| RU | 13929 U1 | 6/2000 |
| RU | 2317572 C1 | 2/2008 |
| SU | 1382736 A | 3/1988 |
| SU | 1744660 | 6/1992 |
| WO | 2008/060719 | 5/2008 |
| WO | 2008140654 | 11/2008 |
| WO | 2009/045639 | 4/2009 |

OTHER PUBLICATIONS

Pesa News, "Extending the Range and Geographical Applicability of the Q-Marine Solution," by Tim Bunting, Western Geo, dated Apr./May 2009, 2 pages.

MacArtney A/S—Worldwide Underwater Technology, "ROTV Remote Towed Vehicles," obtained from http://www.macartney.com, generated on Nov. 12, 2009.

"Impacts of Marine Acoustic Technology on the Antarctic Environment," version 1.2, dated Jul. 2002, SCAR Ad Hoc Group on Marine Acoustic Technology and the Environment, 62 pgs.

Ion Marine Imaging Systems—Optimizing 4D Repeatability with Enhanced Acquisition Technologies, by Mike Burnham, 4pgs., (c) 2007.

Jokat, W. et al. "Marine Seismic Profiling in Ice Covered Regions," Polarforschung 64 (1): 9-17, 1994.

Terra Antarctica, "A Novel Over-Sea-Ice Seismic Reflection Survey in McMurdo Sound, Antarctica," by S. J. Betterly, Montana Tech of the University of Montana, dated Sep. 18, 2007.

Ion Marine Imaging Systems, "Model 5011 Compass Bird, Performance Data," (c) 2007.

Ion Marine Imaging Systems, "Model 5010 DigiBIRD, Performance Data," (c) 2007.

Ion Marine Imaging Systems, DigiFIN, Performance Data (c) 2008.

"HNB Ice Period Buoy Manufacturer Exporting Direct from Hebei China," obtained from http://buoy.en.alibaba.com, generated on Sep. 25, 2009.

Ice Spar Buoy, Rotonics Mfg. Inc., http://www.rotonics.com, 2807 Stephen F. Austin Drive, Brownwood, TX 76801, dated Jun. 3, 2003.

Intelligent Acquisition—"Streamer Steering Case Study," obtained from http://www.iongeo.com, generated on Nov. 10, 2009.

Fugro News, "Fugro Announces Purchase of Focus-2 ROTV Systems," dated Nov. 16, 2005, obtained from http://www.fugro.com, generated on Nov. 21, 2009.

"ORCA—Instrument Room Control System," obtained from http://www.iongeo.com, generated on Nov. 10, 2009.

Ion Geophysical, "DigiFIN:Streamer Steering ," obtained from http://www.iongeo.com, generated on Nov. 10, 2009.

"Slocum Glider: Design and 1991 Field Trials," prepared by Paul Simonetti, Webb Research Corp., under subcontract from Woods Hole Oceanographic Institiution, Office of Naval Technology, Contract No. N00014-90C-0098, dated Sep. 1992.

"Triaxus Towed Undulator," MacArtney Underwater Technology Group, dated Oct. 1, 2005.

International Search Report and Written Opinion in PCT/US2010/026617, dated May 4, 2010.

Danish Examination Report from counterpart DK Appl. No. PA 2010 70472, dated Sep. 22, 2011.

European Search Report from counterpart EP Appl. No. 12168832.9, dated May 3, 2013.

International Search Report from counterpart PCT Appl. No. PCT/US2012/036739, dated May 3, 2013.

Official Action in counterpart Russian Appl. No. 2011140864, dated Apr. 29, 2012.

Translation of Official Action in counterpart Russian Appl. No. 2011140864.

Pending Claims in n counterpart Russian Appl. No. 2011140864.

Technical and Search Report in counterpart Danish Appl. No. PA201270271, dated Dec. 6, 2012.

\* cited by examiner

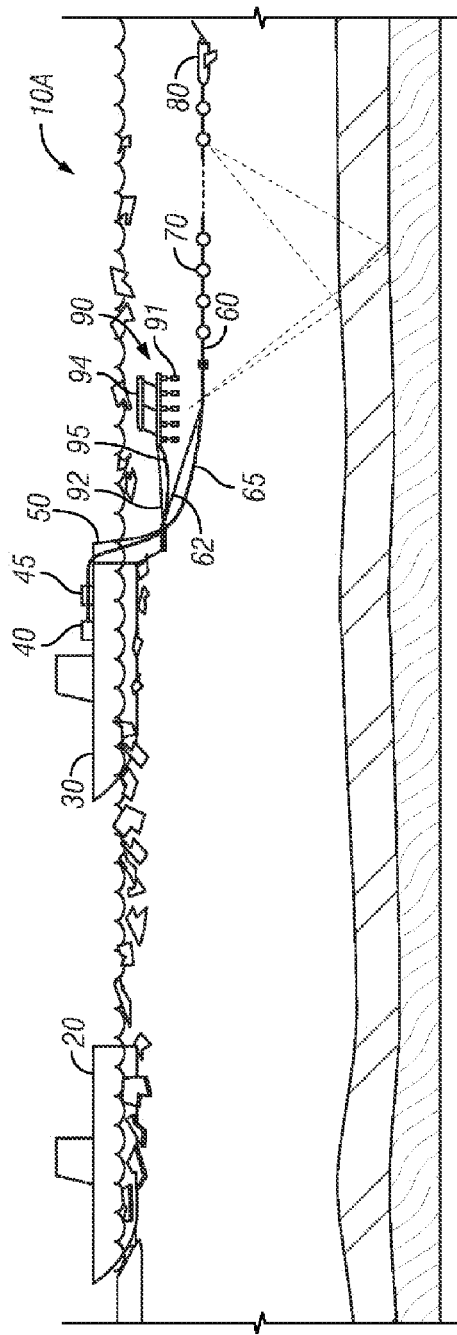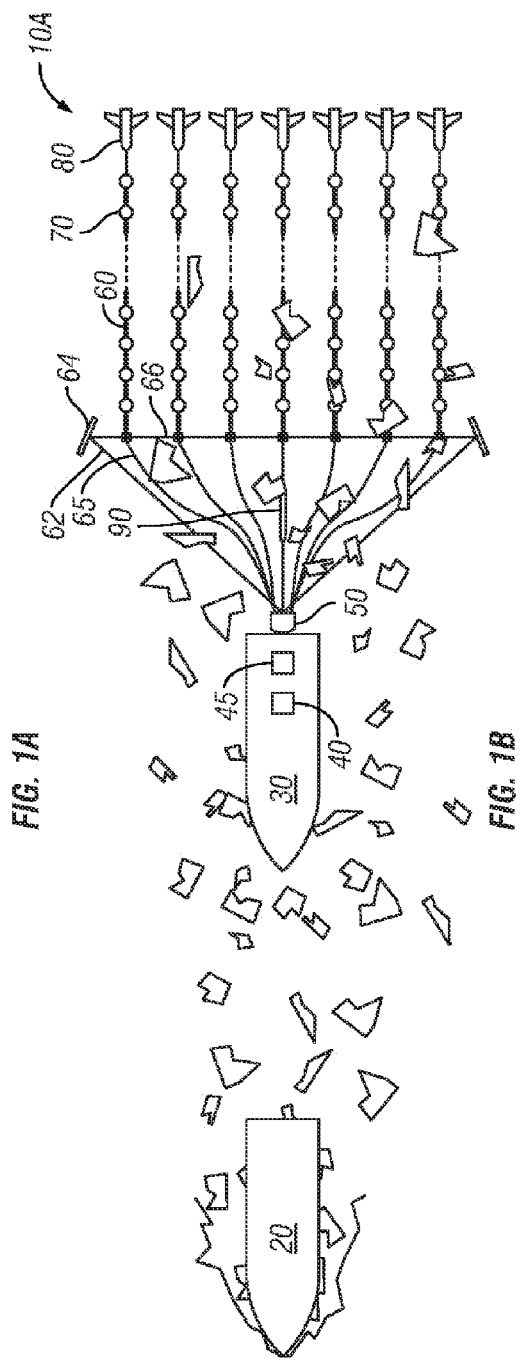
FIG. 1A
FIG. 1B

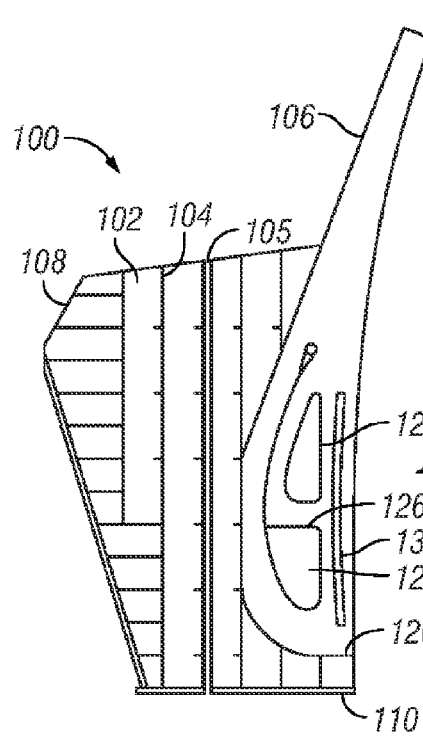
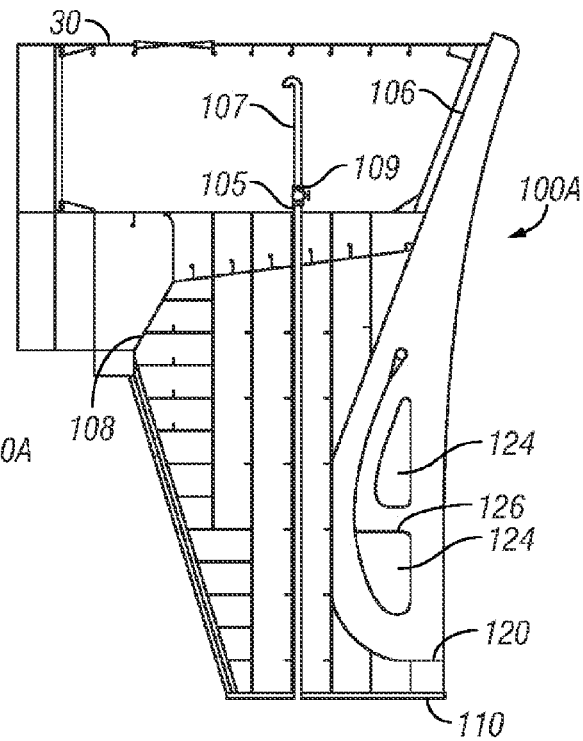
FIG. 3A  FIG. 3B
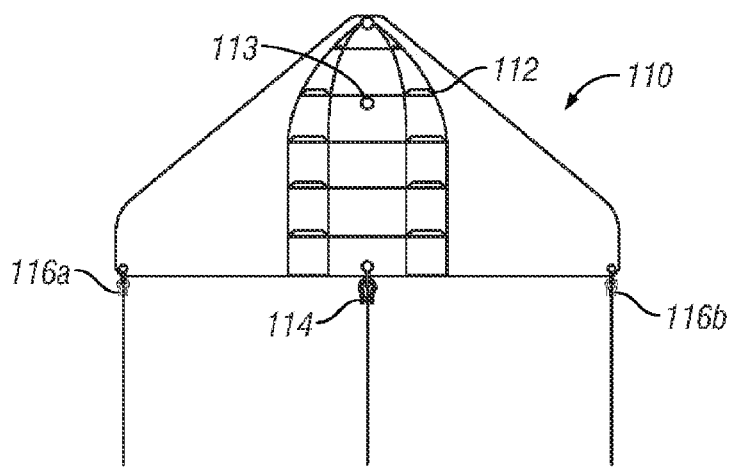
FIG. 3C

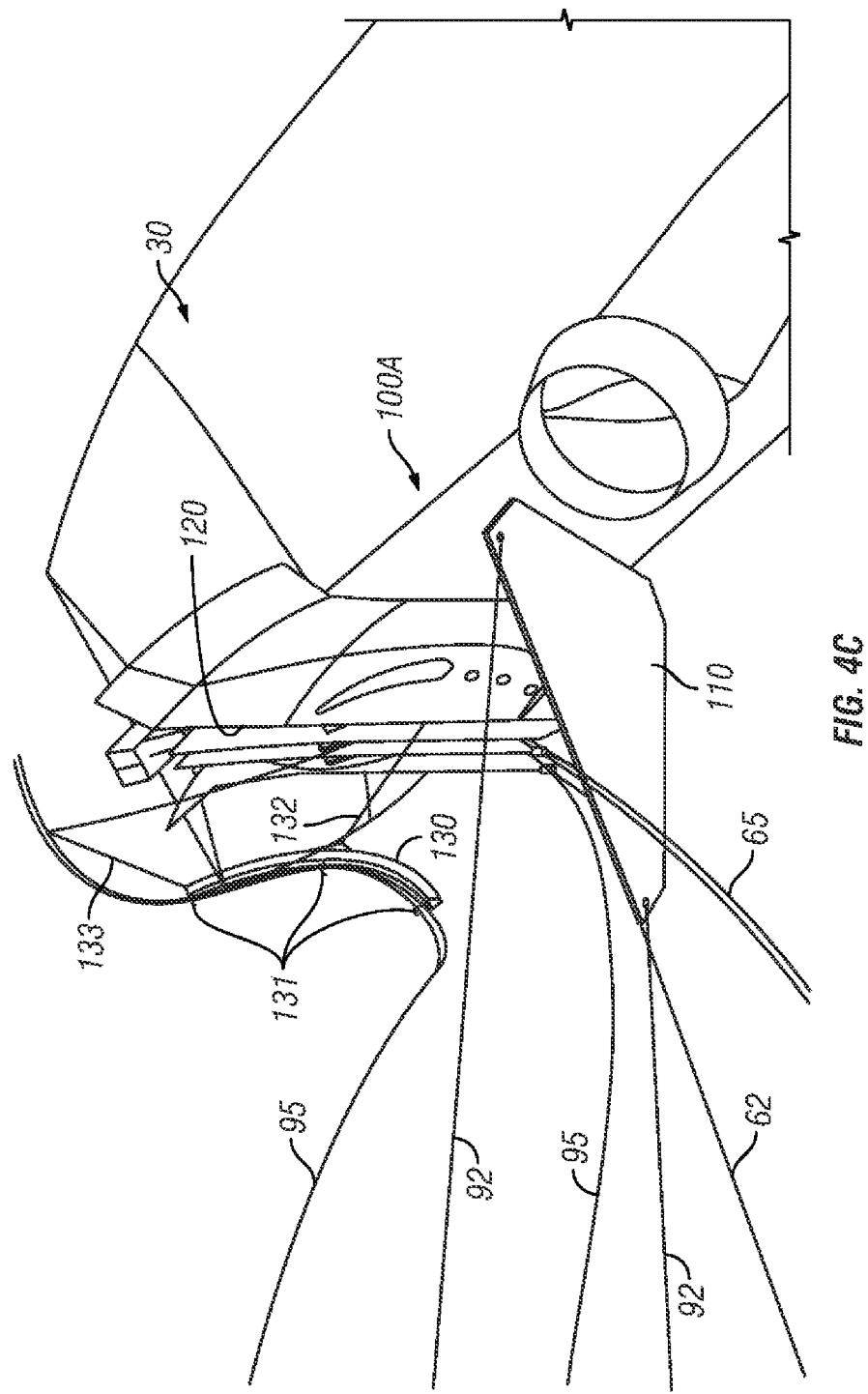

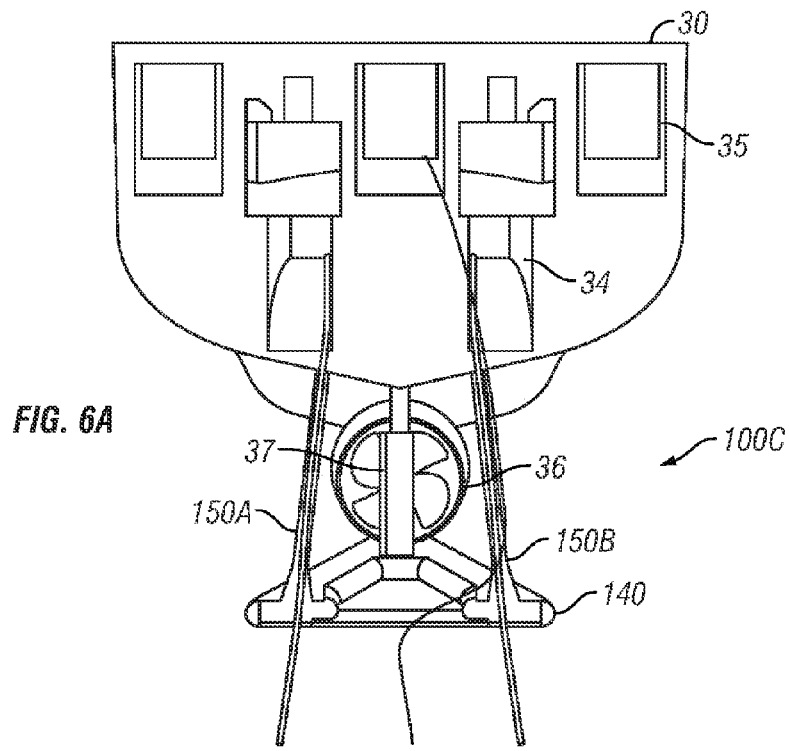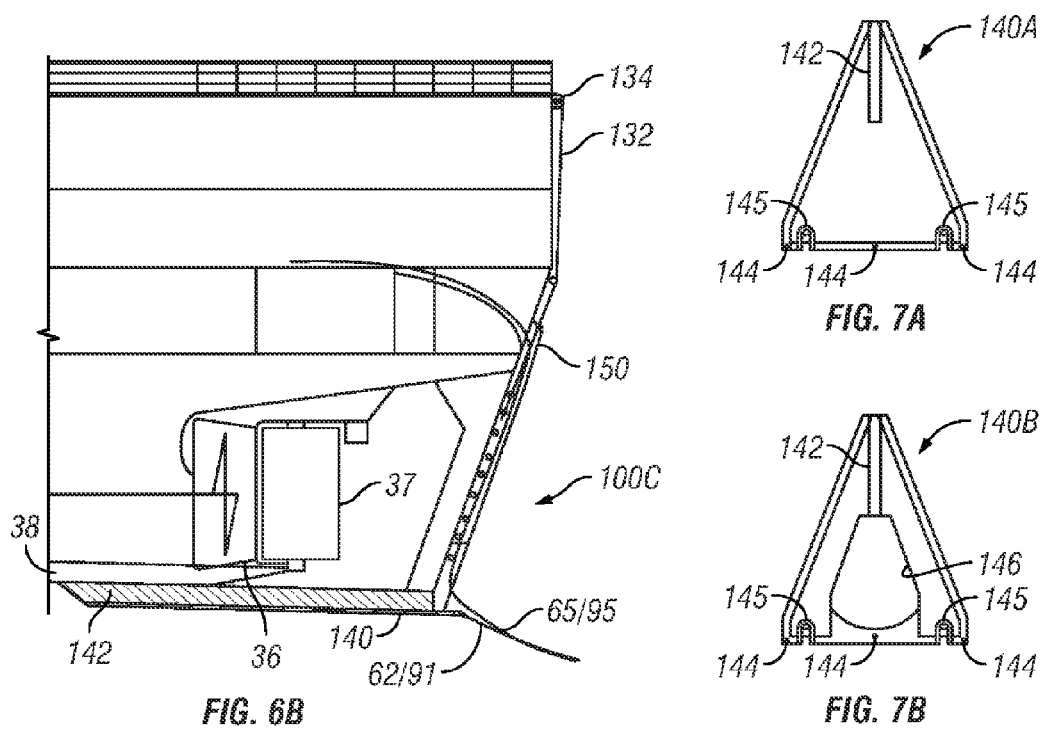

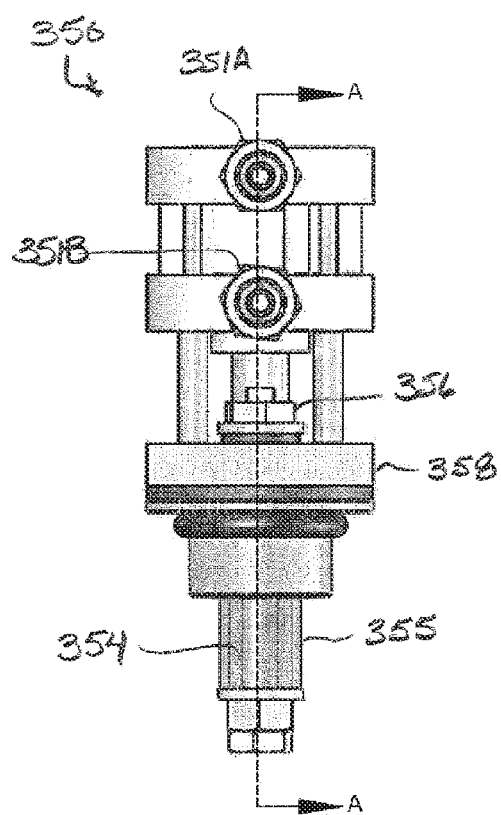
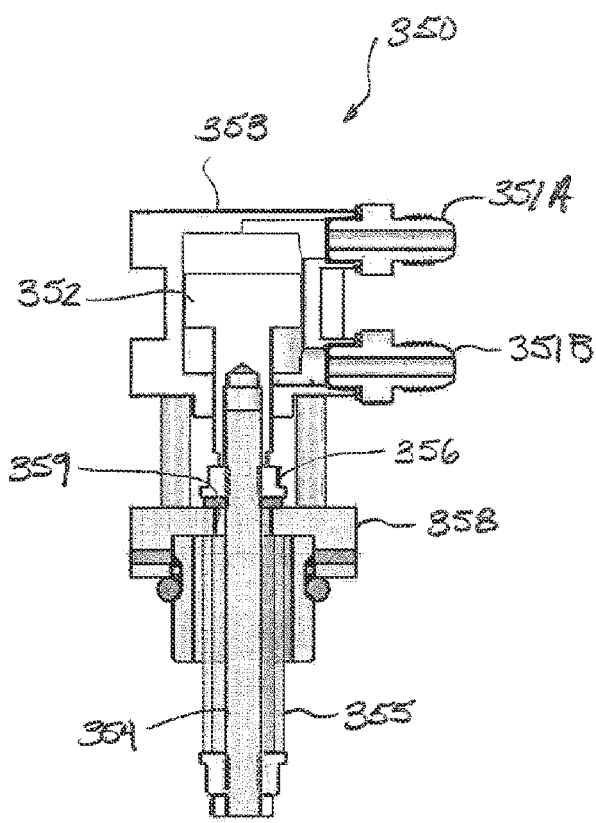
FIG. 13C
FIG. 13D

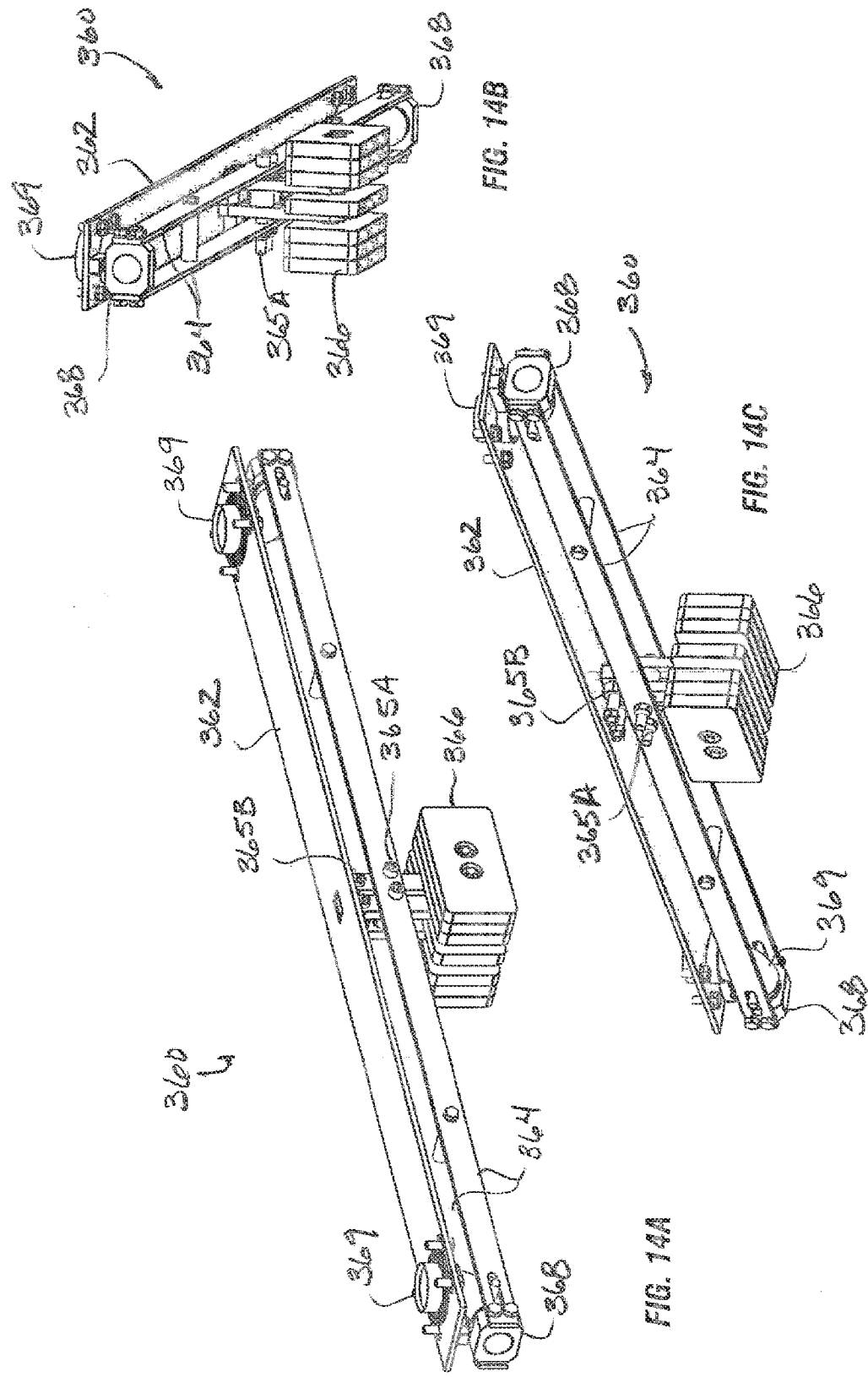

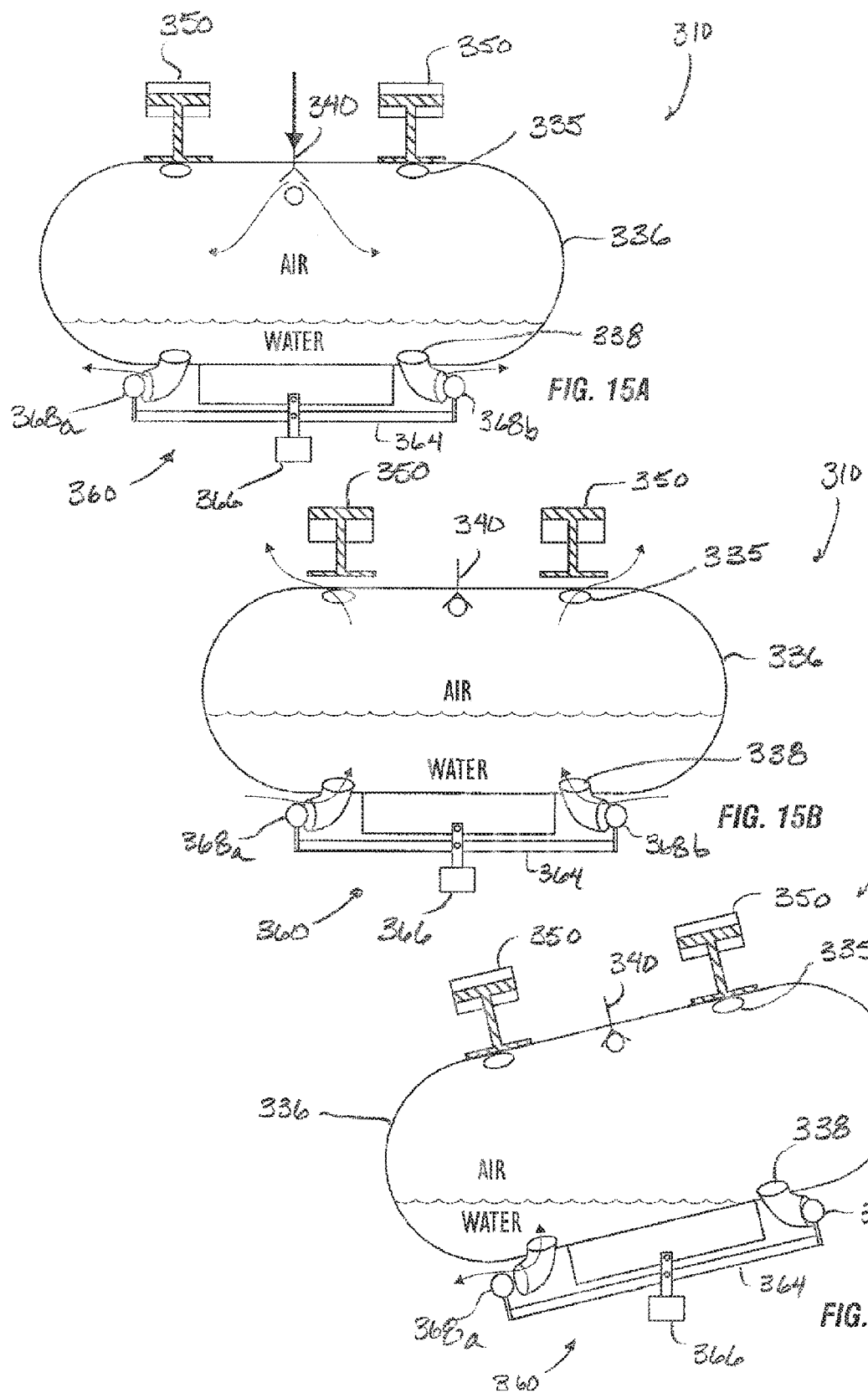

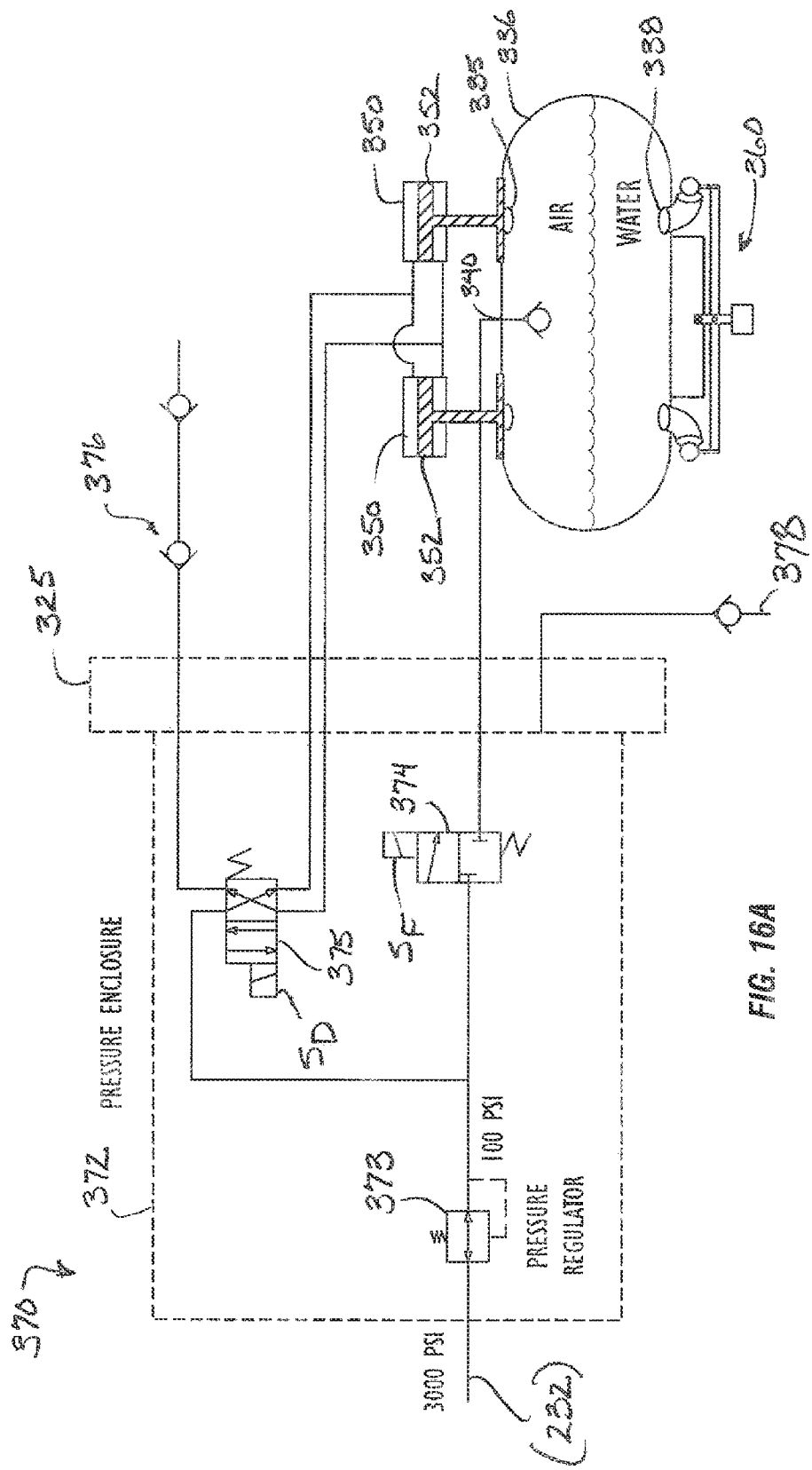

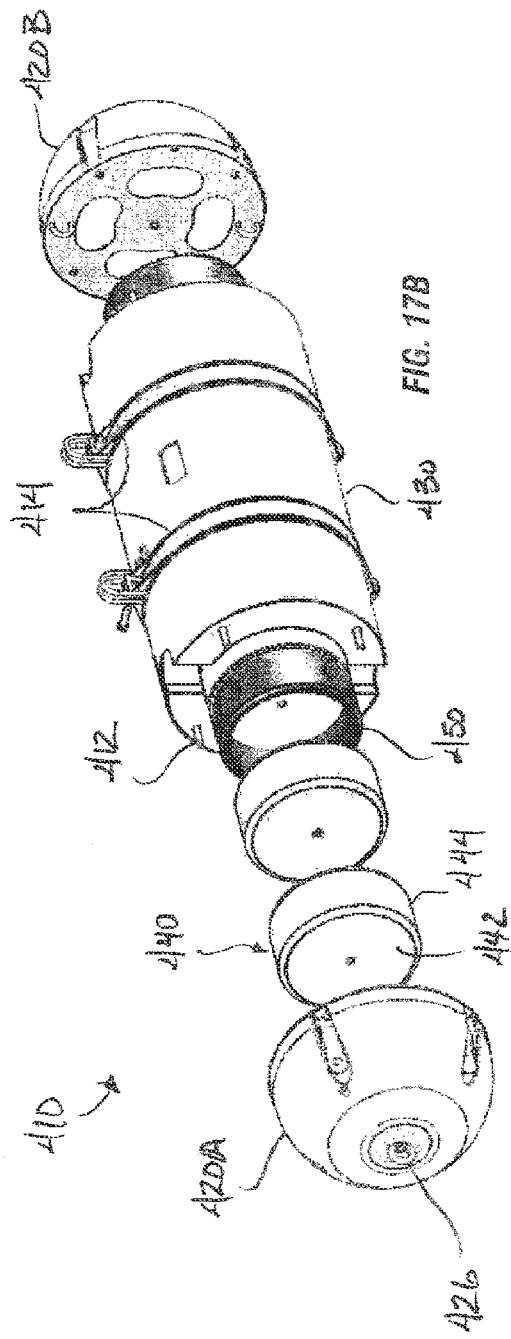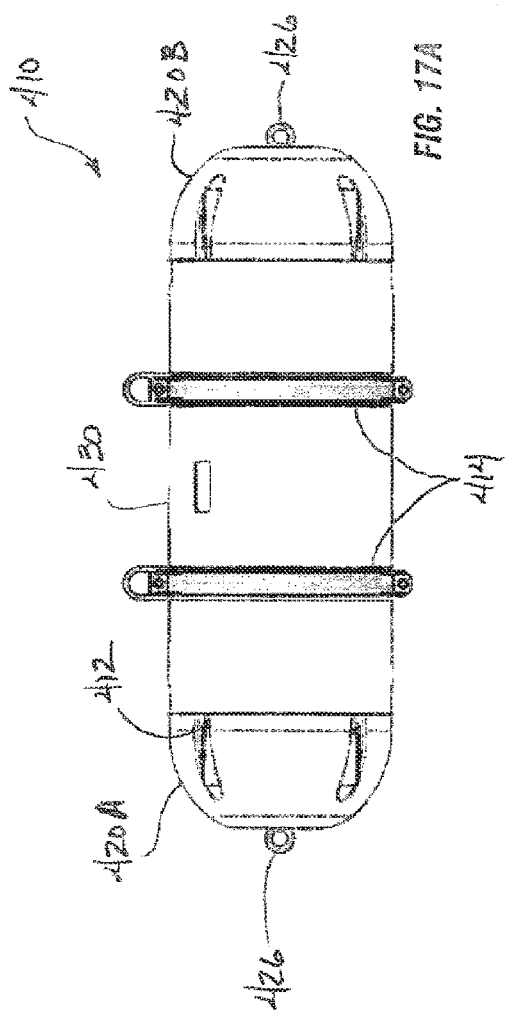

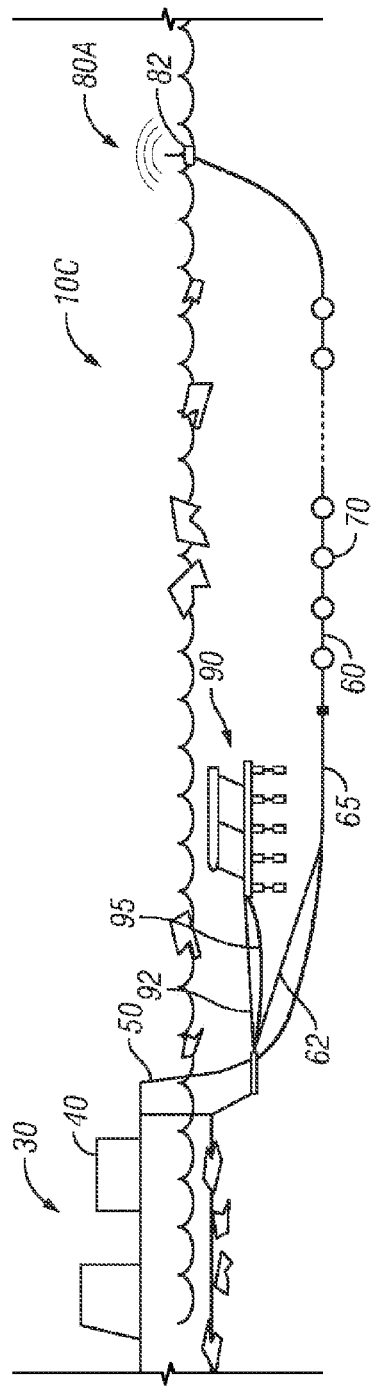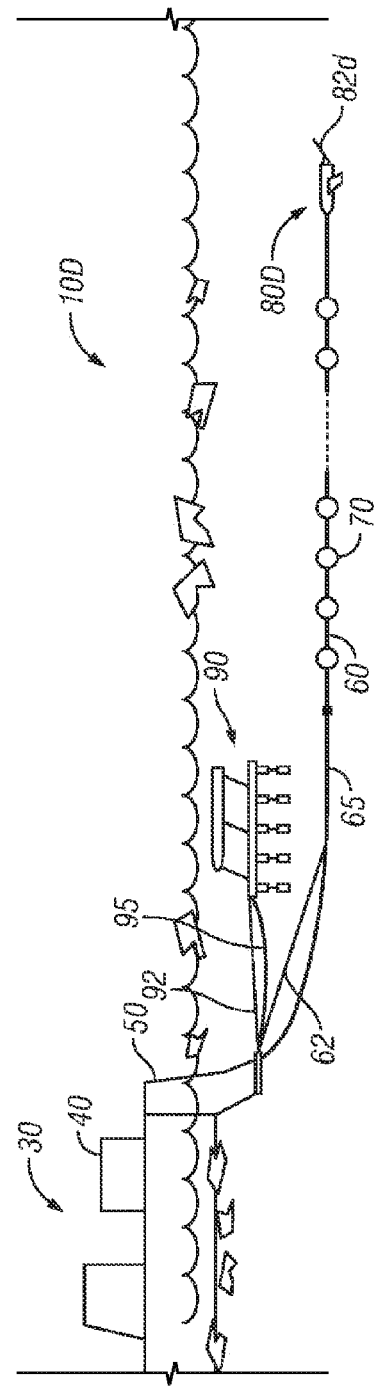

MARINE SEISMIC SURVEYING WITH TOWED COMPONENTS BELOW WATER SURFACE

CROSS-REFERENCE TO RELATED APPLICATIONS

This is a continuation-in-part of U.S. patent application. Ser. No. 12/719,783, filed 8 Mar. 2010, which is incorporated herein by reference, to which priority is claimed, and which is a non-provisional of U.S. Prov. Appl. Nos. 61/158, 698, filed 9 Mar. 2009 and entitled "Marine Seismic Surveying in Icy Waters; 61/246,367, filed 28 Sep. 2009 and entitled "Floatation Device for Marine Seismic Surveying in Icy Waters;" and 61/261,329, filed 14 Nov. 2009 and entitled "Marine Seismic Surveying in Icy or Obstructed Waters," which are each incorporated herein by reference in their entireties and to which priority is also claimed.

BACKGROUND

Conventional marine seismic surveying uses a seismic source and a number of streamers towed behind a seismic survey vessel. These streamers have sensors that detect seismic energy for imaging the formations under the seafloor. Deploying the streamers and sources and towing them during a survey can be relatively straightforward when operating in open waters with moderate swells or the like.

Marine locations covered by ice, debris, large swells, or other obstacles can make surveying more difficult, expensive, or even impossible. In icy waters, for example, the seismic survey vessel must break through ice and traverse waters filled with ice floes. The noise generated by ice impacts can complicate the seismic record produced.

Additionally, the ice floes on the water's surface make towing the source and streamers more difficult and prone to damage. For example, any components of the system at the water's surface can encounter ice, become bogged down, and lost. In addition, any cables or towlines coming off the vessel even from slipways can collect ice at the surface. Likewise, ice pulled under the hull and rising behind the vessel can shear away these cables and lines.

Some approaches for performing seismic surveys in icy regions known in the art are disclosed in U.S. Pat. Nos. 5,113,376 and 5,157,636 to Bjerkoy. To date, however, the problems associated with marine seismic surveying in icy or obstructed waters have not been significantly addressed. The subject matter of the present disclosure is directed to overcoming, or at least reducing the effects of, one or more of the problems set forth above.

SUMMARY

A marine seismic surveying apparatus has a skeg that mounts on a vessel and preferably on the vessel's aft or stern. The skeg's distal end extends below the vessel's waterline and can even extend several meters below the vessel's keel. A seismic surveying system deploys from the vessel and has a number of cables for streamers and for a seismic source, such as an air gun array. To protect these cables, a channel in the skeg's after edge holds the cables and directs them below the vessel's waterline. In this way, surface ice or other elements at the water's surface cannot interfere with the cables while the seismic surveying system is being towed.

The skeg's distal end has tow points, which can be provided on a base. Towlines for the system's streamers and source connect to these tow points. In this way, these towlines deploy under the water and away from any ice or other elements that may be present at the water's surface.

In the towed survey system behind the vessel, a floatation device supports a towed component below the water's surface, such as a horizontally arrayed seismic source or an air gun array. Preferably, this device floats below the water's surface to avoid ice floes, waves, wind, obstructions, and the like—even conventional issues encountered in normal operations at the water's surface.

The floatation device has a set of floats that submerge below the surface of the water and support the towed component, such as the air gun array. The set of floats includes at least one depth controlled float and at least one adjustable buoyancy float. The depth controlled float is in communication with a pneumatic fluid source on the vessel, such as a source of pressurized air or other gas for the air gun array. The depth controlled float has its buoyancy controlled with the pressurized gas and actively controls the depth of towed component in the water. The at least one adjustable buoyance float connects in line with the at least one depth controlled float with a flexible connection. The adjustable buoyancy float has its buoyancy preconfigured to counterbalance the weight in water of the towed component or at least a portion of the towed component that the float supports.

The foregoing summary is not intended to summarize each potential embodiment or every aspect of the present disclosure.

BRIEF DESCRIPTION OF THE DRAWINGS

FIGS. 1A-1B show side and plan views of a marine seismic survey system according to certain teachings of the present disclosure for use in icy regions.

FIGS. 3A-3B are cross-sectional views of the skeg.

FIG. 3C is a top view of the skeg's blade.

FIGS. 4A-4C show perspective views of deploying cables, towlines, and components of a marine seismic system using the disclosed skeg.

FIG. 6A is an aft view of a vessel having a dual channel skeg according to the present disclosure.

FIG. 6B is a side view of the dual channel skeg in partial cross-section.

FIGS. 7A-7B shows plan views of blades for the dual channel skeg.

FIGS. 13C-13D illustrate side and cross-sectional views of an exhaust valve for the depth controlled float in FIGS. 12A-12D.

FIGS. 14A-14C illustrate perspective views of the pendulum valve assembly for the depth controlled float in FIGS. 12A-12D.

FIGS. 15A-15C schematically illustrate filling and exhausting the tank of the depth controlled float in FIGS. 12A-12D.

FIG. 16A illustrates a schematic of the pneumatic control of the depth controlled float in FIGS. 12A-12D.

FIGS. 17A-17D illustrate side, exploded, and two cross-sectional views of the adjustable buoyancy float of the floatation system in FIGS. 11A-11B.

FIGS. 18A-18B illustrate side views of marine seismic survey systems having a flotation system and controllable devices.

DETAILED DESCRIPTION

A. Marine Seismic Survey System

Figure 2A:
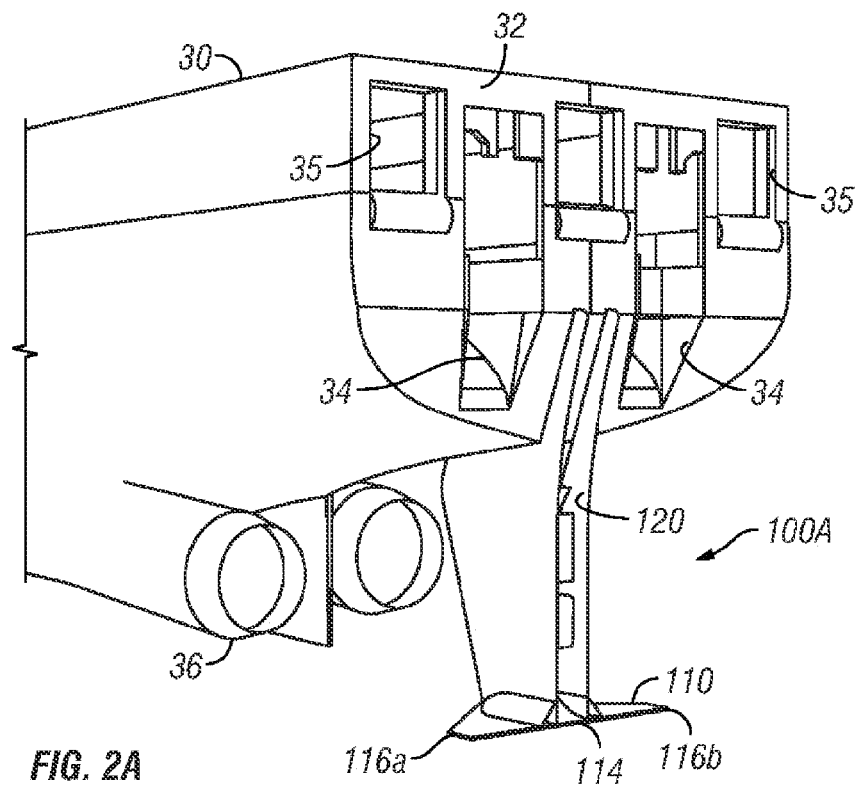
FIGS. 2A-2D show perspective, back, side, and top views of an skeg on a vessel for towing an array of seismic streamers and a source.

A marine seismic survey system 10A in FIGS. 1A-1B can be used in icy regions having glacial ice, pack ice, and ice floes. However, elements of the system 10A can be used in other locations having debris, plants, flotsam, jetsam, or other obstructions or obstacles at the water's surface that can interfere with towed components of the marine seismic survey system. In fact, this system 10A and others disclosed herein can be used in any environment—not just those prone to physical obstructions or obstacles, such as ice. For example, weather, large swells, noise, conventional hazards, and even normal conditions encountered in marine seismic surveys can benefit from the systems of the present disclosure. Accordingly, reference to icy or obstructed waters in the present disclosure is meant to be illustrative.

In icy regions, for example, the system 10A preferably includes an icebreaker vessel 20 that breaks ice in advance of a tow vessel 30. In operation, the icebreaker vessel 20 breaks pack ice and diverts ice floes to create a tract for passage of the tow vessel 30. As the tow vessel 30 tows one or more streamers 60, a supply system 45 operates a source 90, and a control system 40 having a seismic recorder records the seismic data obtained with sensors 70 on the streamers 60.

Because the tow vessel 30 operates in icy or obstructed waters or even when the tow vessel 30 operates under normal conditions in typical waters, a protective device 50 on the tow vessel 30 couples to towlines 65 that support the streamers 60. (Although multiple streamers 60 are shown, the system 10A can have one steamer 60 if desired). As discussed below, the protective device 50 (referred to herein as a skeg) keeps towlines and cables for the towed components away from the water's surface, which can have ice floes for icy regions, other obstacles in other regions, or the like, for example. The skeg 50 allows the vessel 30 to tow the streamers 60 while handling various loads caused by motions of the vessel 30, forces from the towed bodies, and interactions with the possible ice, waves, or other impediments.

In general, the skeg 50 can be located anywhere on the vessel 30. As best shown in FIG. 1A, however, the skeg 50 preferably extends from the vessel's hull at the stern. This abaft position is better suited for deploying cables, towlines, and other components of the marine seismic survey system being towed by the vessel 30. In one arrangement, the skeg 50 is a static addition to the vessel 30 that can be welded, incorporated, or otherwise attached in a shipyard to an existing design of a vessel's hull. Alternatively, the vessel 30 can be predesigned and built with an appropriate skeg 50 incorporated into its hull design, or the skeg 50 may be a deployable component provided with appropriate mechanisms for deploying and holding it on the vessel 30. In yet another arrangement, the skeg 50 can be a portable or independent component that can be mounted temporarily on the side of the vessel without the need for modifying the vessel's hull.

Extending below the vessel's waterline, the skeg 50 keeps the attachment points for towlines 62/92 below the surface of the water. This keeps the towlines 62/92 below the water's surface and away from any issues (e.g., any ice floes floating on the water's surface that could interfere with or collect around the towlines 62/92). Streamer cables 65 connected to the seismic recorder of the control system 40 extend form the vessel 30, and the skeg 50 directs these streamer cables 65 below the water's surface (e.g., so that ice will not interfere with or collect around them). For icy or obstructed regions, the depth required to effectively hold the streamer cable towlines 62 and streamer cables 65 below any ice level can be depend on the particular implementation. As one example, the skeg 50 may extend about 7-m below the vessel 30's waterline. However, this distance can vary for a given implementation, depending on the type of ice regime in which the vessel is operating, the size of the vessel, and other factors.

In the present arrangement, a seismic source 90 suspends horizontally in the water column behind the vessel 30 and has a plurality of seismic source elements 91, which are typically air guns. (Although one source 90 is shown, the system 10A can use multiple sources.) A supply cable 95 connected to the supply system 45 extends from the vessel 30, and the skeg 50 also directs this supply cable 95 below the water's surface so it is out of the way of ice, obstacles, waves, swells, and the like as well. A towline 92 connects the cable 95 to the skeg 50 and helps tow the source 90 behind the vessel 30.

The supply cable 95 is preferably buoyant, and the source 90 can be stabilized by one or more flotation devices or buoys 94. For icy regions, because ice moves along the surface of the water, the flotation device 94 can be designed to handle interactions with ice as it floats at the surface. Accordingly, the flotation device 94 can be shaped to minimize impacts with ice or other obstacles and can be arranged horizontally to cut through any ice floes or obstructions at the surface. Preferably, however, the flotation device 94 is designed to avoid contact with ice or other obstacles by floating below the surface, as discussed in more detail later.

To tow the horizontal source 90 behind the vessel 30, the towline 92 secures to the skeg's base under the water and connects to the source 90 suspended below the water's surface. One or more support lines interconnect the flotation device 94 with the source 90. The supply cable 95 extends off the end of the vessel 30, fits through a channel in the skeg 50, and connects to the source 90 for operation.

In general, the towlines 62/92, streamers 60, sensors 70, cables 65/95, control system 40, and supply system 45 can be conventional components known and used in marine seismic surveying. For example, the source elements 91 can be operated in any conventional manner to create a suitable seismic source signal. In addition, the streamers 60 can use neutrally buoyant cables used for supporting appropriate marine seismic sensors 70. As such, each streamer 60 can have several sections with each having an outer skin to protect the interior from water and having axial members along its length for axial strength. Each section of the streamer 60 can also have a wire bundle that carries electrical power and data communication wires. For the pair, the sensors 70 are typically hydrophones located within the streamer 60.

As further shown in FIG. 1B, paravanes, fins, or doors 64 and a spreader 66 can be used to support multiple streamers 60 behind the tow vessel 30. These paravanes 64 and spreader 66 can also be similar to conventional components used for marine seismic surveying, except that the paravanes 64 preferably tow under the water's surface as discussed later.

With an understanding of the disclosed system, discussion now turns to particular components of the system, starting with the skeg.

B. Single Conduit Skeg

Figure 2B:
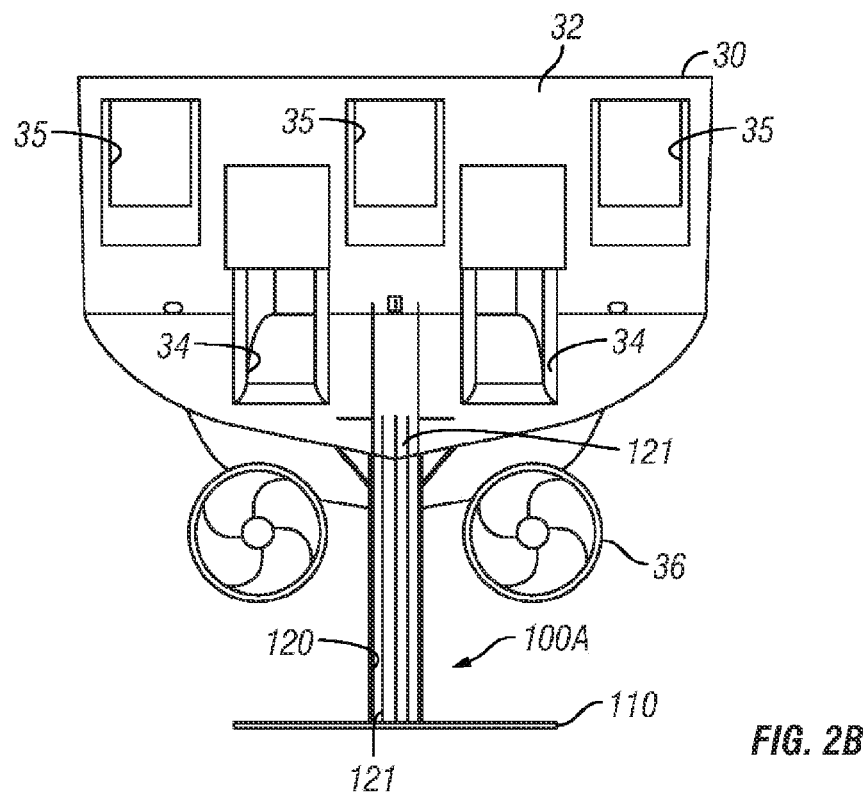

As discussed above, the tow vessel 30 uses the skeg 50 to keep the towlines 62/92 and cables 65/95 below the water's surface (e.g., away from ice floes or the like). As shown in FIGS. 2A-2B, one embodiment of a skeg 100A mounts onto the aft 32 of the seismic tow vessel 30 used to tow seismic streamers (not shown). As noted previously, the skeg 100A can mount anywhere on the vessel 30, including the port, starboard, bow, or through a moon pool in the hull. However, the stern or aft 32 of the vessel 30 is preferred because the streamers (not shown) are best towed behind the vessel 30, which can help break waves, ice floes, or the like while towing the streamers.

In this embodiment, the skeg 100A is a single conduit extending from the aft 32 of the vessel 30. So as not to interfere significantly with the vessel's steering and other functions, this single conduit skeg 100A is preferably used on a vessel 30 having dual screws 36, although it could be used with other types of vessels. The skeg 100A extends under the hull between slipways 34 used for deploying and retrieving steamers and cables. Along its after or trailing edge, the skeg 100A defines an open passage or channel 120 for passage of steamer cables, source cables, and slack lines as discussed later.

Even though the skeg 100A extends off the aft 32, ice may be forced to flow along the bottom of the vessel's hull when surveying in icy waters. This forced ice eventually reaches the aft 32 of the vessel 30 where it again resurfaces. In other situations, ice impacted by the bow of the vessel 30 may be forced under the vessel's hull and then attempt to resurface toward its aft 32 as the vessel 30 travels forward. In any event, the skeg 100A acts as a protective conduit to keep the towlines, cables, and the like away from this ice.

At its distal end, the skeg 100A has a base or plate 110 that provides attachment points 114/116*a-b* for the towlines. In this way, the skeg 100A provides tow points 114/116*a-b* below the water's surface (and away from the ice floes at the surface). In addition to remaining protected, these undersurface tow points 114/116*a-b* also help maintain the streamers and source below the surface.

Figure 2C:
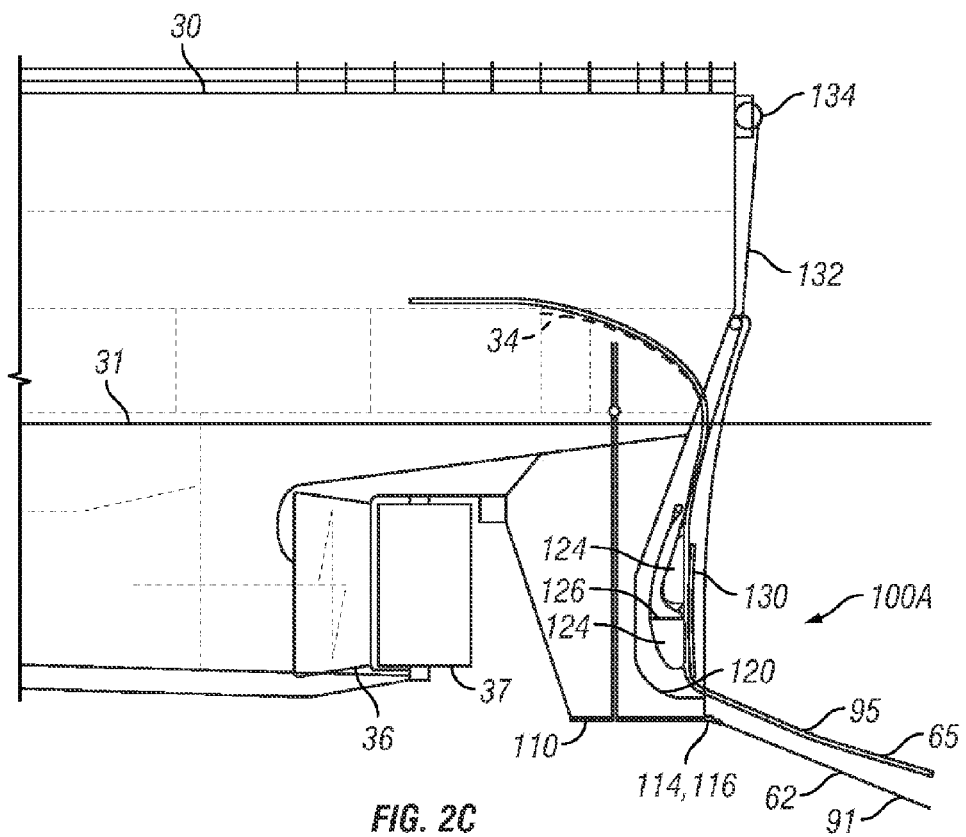
Figure 2D:
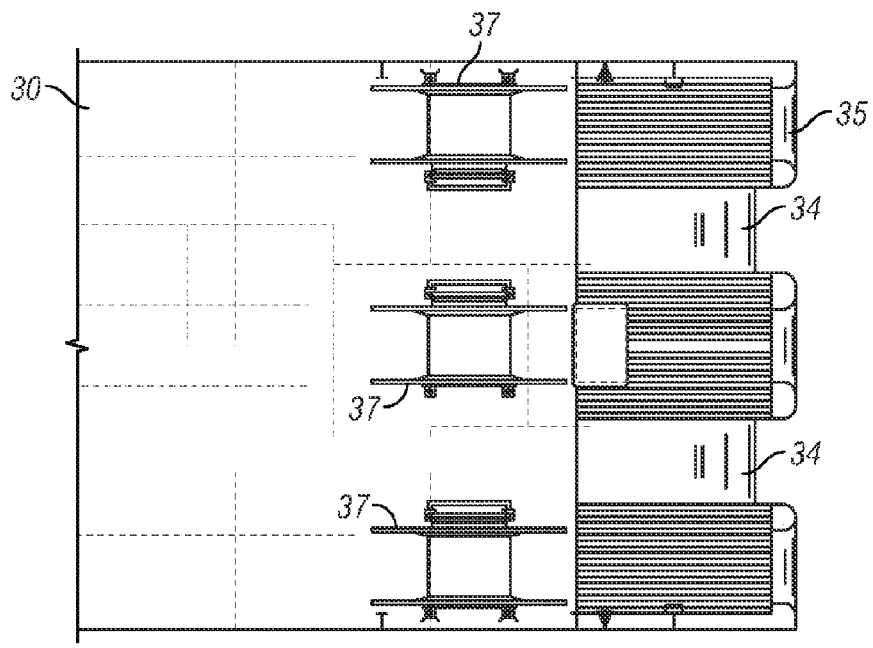

Additional details of the skeg 100A are shown in FIGS. 2C-2D illustrating the skeg 100A mounted on the vessel 30. As best shown in FIG. 2C, the distal end of the skeg 100A positions to about the depth of the vessel's keel, and the tow points 114/116 are held below the vessel's waterline 31, as mentioned previously.

As also shown in FIG. 2C, streamer cables 65 and supply cables 95 run off the vessel 30 through slipways 34 (See also FIG. 2D). The cables 65/95 pass through the channel 120 in the skeg 100A. In turn, the channel 120 directs the cables 65/95 under the vessel's waterline 31 toward the skeg's base 110, where the cables 65/95 can then follow the vessel 30 without interference from ice floes or the like.

One or more line stiffeners or bend limiters 130 hold the cables 65/95 in the skeg's channel 120, and slack lines 132 pass in the channel 120 and attach to these line stiffeners 122. In addition, steel guides 124 in the channel 120 can support the cables 65/95, and a curved passage 126 can be provided for the slack lines 132 so that they can be diverted through the channel 120 separately from the cables 65/95. The slack lines 132 can have about a ⅝-in. (16-mm.) diameter so that three to four slack lines 132 may fit into the guides' passage 126. Each slack line 132 leads to a hydraulic winch 134 used for pulling the line 132 and attached stiffener 122 to which they are coupled.

As shown in the top view of FIG. 2D, the vessel 30 has slipways 34 leading off the vessel's stern for passage of streamer and source cables (not shown). Other slipways 35 are also provided and aligned with winches 37 for holding tow and retrieval lines for the seismic survey system. Thus, the vessel 30 can have these and other conventional features known and used in the art for marine seismic surveying.

Referring to FIGS. 3A-3B, the upper extension 106 and the inside corner 108 of the skeg 100A can be designed to suit an existing vessel and its ice horn. As shown in these cross-sections, the skeg 100A is internally hollow and has outer shell walls 102 and internal supports 104. In one implementation, for example, the skeg 100A may have an internal volume of approximately 14 cubic meters and may weigh about 27-MT.

The hollow internal volume gives the skeg 100A some buoyancy that can help support the skeg's weight on the vessel 30. To ensure that the skeg 100A remains free of water, the skeg 100A can be fitted with a means of sounding and a means of de-watering as well. For this reason, the skeg 100A can have an internal passage 105 extending from top to bottom and fitted with a pipe 107 and a gate valve 109 at the vessel's deck as shown in FIGS. 3A-3B.

As best shown in FIG. 3C, the skeg's base 110 can be a fin or beaver shaped plate, although other shapes could be used. The base 110 can be fixed to the distal end of the skeg 100. Alternatively, the base 110 can be mounted on a swivel or hinges so it can rotate laterally and/or vertically. As shown, the base plate 110 has brackets 112 for attaching to the end of the skeg's body. As also shown, the base 110 has an opening 113 for passage of the pipe (107; FIG. 3B) and has three tow points 114/116*a-b*.

The outer tow points 116a-b can be used for towlines that support sources (not shown), and the center tow point 114 can be used for a towline that supports the one or more streamers (not shown). In one implementation, the outer tow points 116a-b can be configured for 5-ton loads each, and the center tow point 114 can be configured for an 18-ton load. Other configurations of tow points and different load levels can be provided depending on the implementation. Moreover, the skeg 100A can have tow points 114/116a-b placed elsewhere, and more or less tow points may be provided than shown.

Figure 4A:
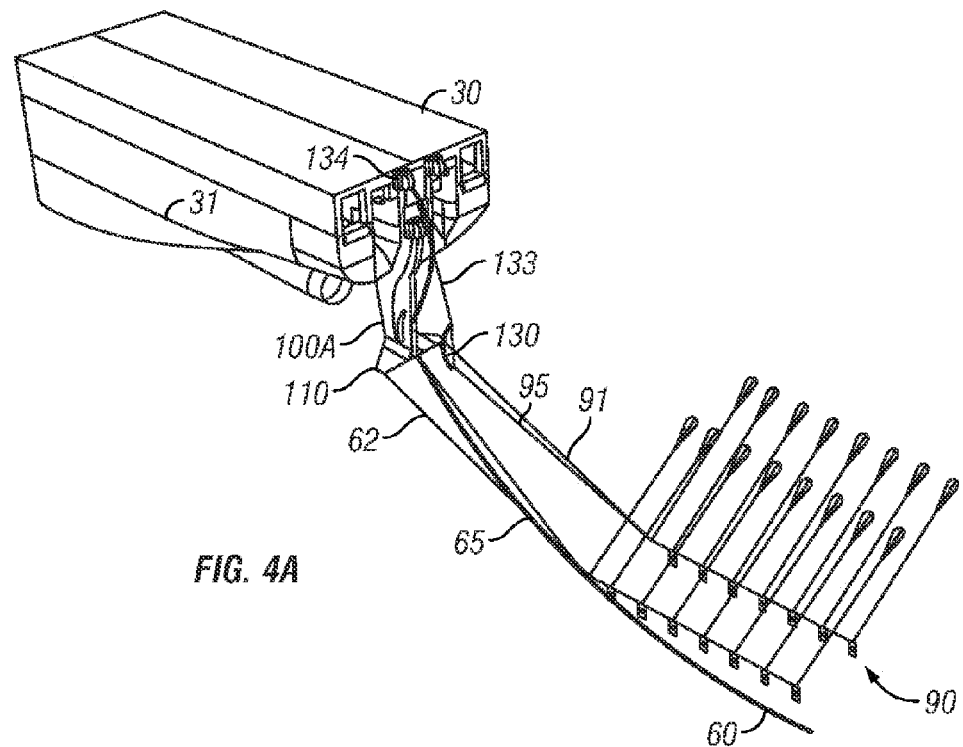
Figure 4B:
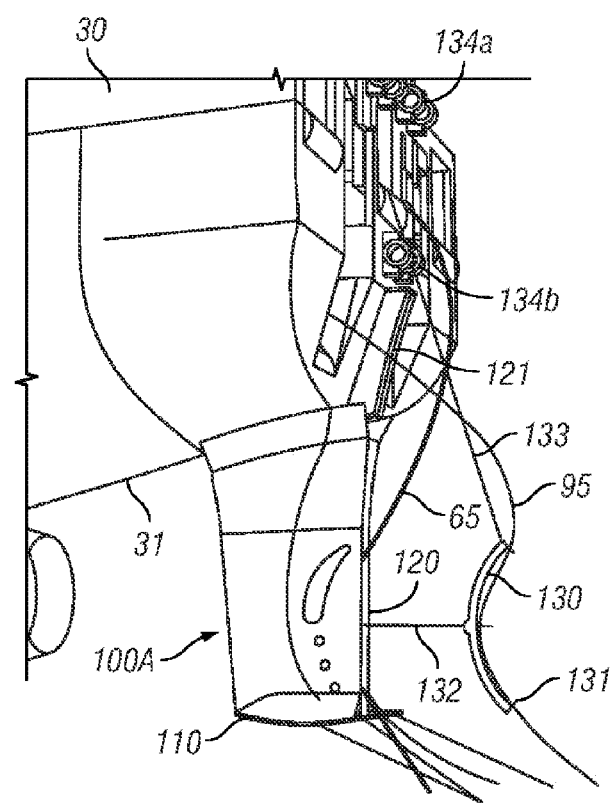

Details of how cables 65/95 are deployed and retained in the skeg 100A are provided in FIGS. 4A-4C. In this arrangement, operators deploy the streamers 60 (one shown), sources 90 (two shown), cables 65/95, towlines 62/92, and other components in the water from the vessel 30 in a conventional manner. As is typically the case, the steamer 60 can be deployed with a number of sensors and devices (not shown) attached thereon. The sensors can determine the steamer's speed in the water, heading, etc. The devices can control the positions of the steamer 60 while being towed. Therefore, deployment of the system 10A may be done in an area significantly clear of obstacles or ice (i.e., outside an overly icy region to be surveyed) because the cables 65/95 and towline 62/92 may need to come off the vessel's stern and pass directly in the water without protection with the skeg 100A.

Once the steamers 60, source 90, and other components are towed out into the water, the streamer cables 65 and source cables 95 are deployed with bend limiters 130 disposed thereon and connected with towlines 133 to the skeg 100A. The bend limiter 130 can define a bend to help tuck the cable 65/95 in the skeg 100A's channel 120 as discussed below. Rings or other couplings 131 on the limiters 130 may allow it to attach to the cables 65/95, while also allowing it to slide along the cable 65/95 when pulling them into the skeg's channel 120.

A slack line 132 extends from a winch 134a to a passage in the skeg 100A. Support cables 133 may also hold these limiters 130 in position and may attach to winches 134b on the vessel 30. Operators use the slack winch 134a to bring in the slack line 132. This pulls the limiter 130 (and attached cable) into the channel 120 of the skeg 100A. This processes is repeated for each of the cables (either source or streamer) to be protected in the skeg's channel 120. A series of slots 121 can be provided along the vessel's aft 32 at the top of the skeg's channel 120 to accommodate any lines or cables passing into the skeg's channel 120.

Once the cables 65/95 have each been pulled into the channel 120 with the limiters 130 and all towlines secured, the vessel 30 can then travel to icier region to survey. As it encounters ice floes or other obstacles, the skeg 100A can then protect the cables 65/95 extending from the vessel 30 and hold the tow points for their towlines 62/95 under the surface of the water.

Figure 5:
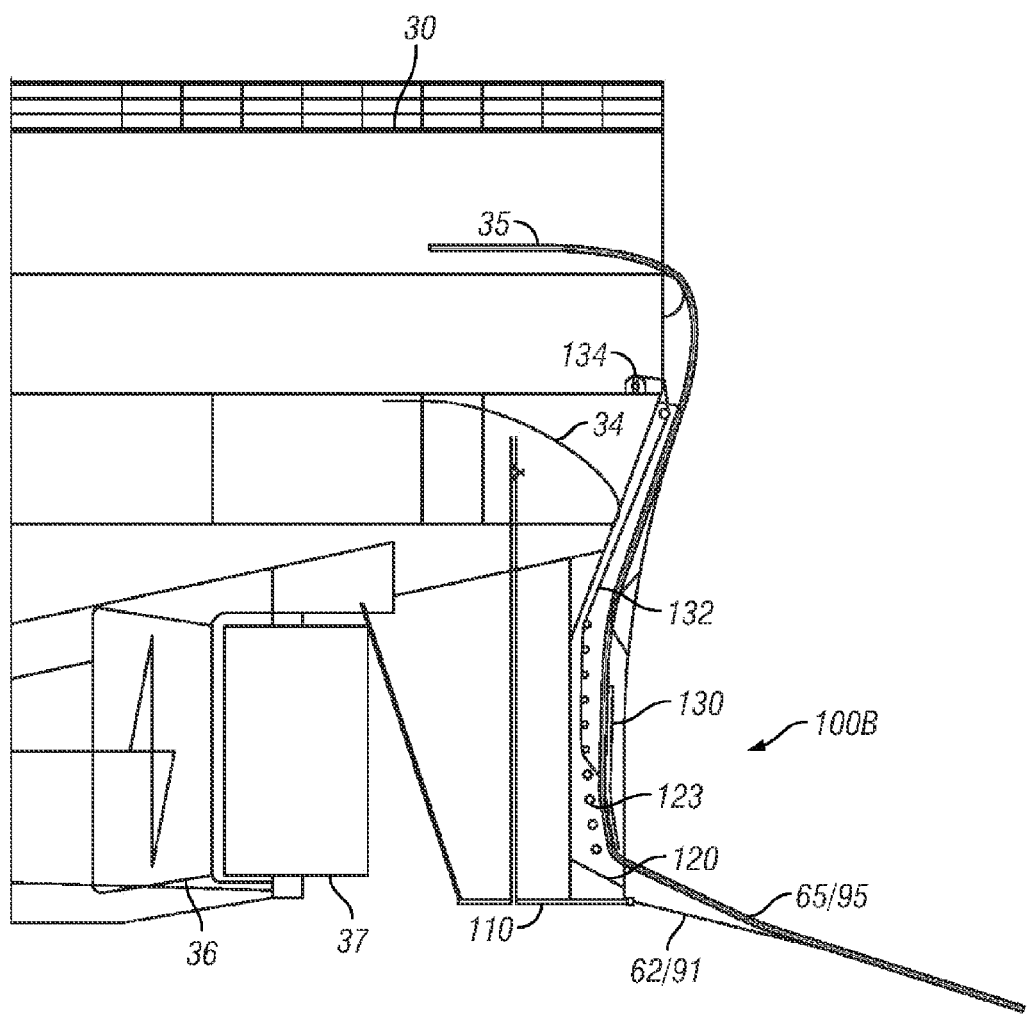
FIG. 5 is a side view of another skeg partially exposed.

An alternate skeg 100B in FIG. 5 is similar to the previous skeg 100A. In this skeg 100B, the channel 120 of the skeg 100B has a plurality of cross bars 123 for support. These bars 123 also provide gaps for passage of the slack lines 132 for the limiters 130 used to pull and retain the cables in the skeg's channel 120. As will be appreciated from these and other skeg designs disclosed herein, the skeg 100 can have more or less complicated features depending on the implementation.

C. Multiple Conduit Skeg

The previously described skegs 100A-B provide a single conduit down the center of the vessel's aft 32, which may be best suited for a vessel 30 with dual screws 36. As an alternative, a skeg 100C in FIGS. 6A-6B provides two or more conduits or passages down a vessel's aft 32 and can be used with a vessel 30 having one screw 36 and rudder 37.

As shown in the aft view of FIG. 6A, the skeg 100C has dual channels 150A-B that pass from the aft 32 of the vessel 30 and under the surface of the water on either side of the vessel's screw 36. In this way, the wake of the screw 36 and rudder 34 of the vessel 30 can remain relatively unobstructed in the open space between the channels 150A-B.

As also shown, the distal ends of these dual channels 150A-B connect to the rear edge of a base plate 140. The base plate 140 can have different shapes. As shown in FIG. 7A, for example, one type of base plate 140A can be a closed, triangular shape with a front edge 142 for attaching to the vessel's keel (38) by welding or other technique. Alternatively, in FIG. 7B (and FIG. 6A), another type of base plate 140B can define an opening 146 therein, which can reduce the overall weight of the plate 140B. In either case, the plate 140A-B itself can contain hollow chambers to reduce weight and can be filled with buoyant materials.

As best shown in FIG. 6B, the base plate 140 at its front end 142 connects to the keel 38 of the vessel 30. As with previous designs, the base plate 140 has tow points 144 for attachment of towlines 62/92 used to support the streamers and source of the seismic system. As shown in FIGS. 7A-7B, for example, these tow points 144 can lie along the tailing edge of the plate 140. In addition, attachment points 145 for the channels 150A-B are also provided on the trailing edge of the plates 140A-B.

Figure 8A:
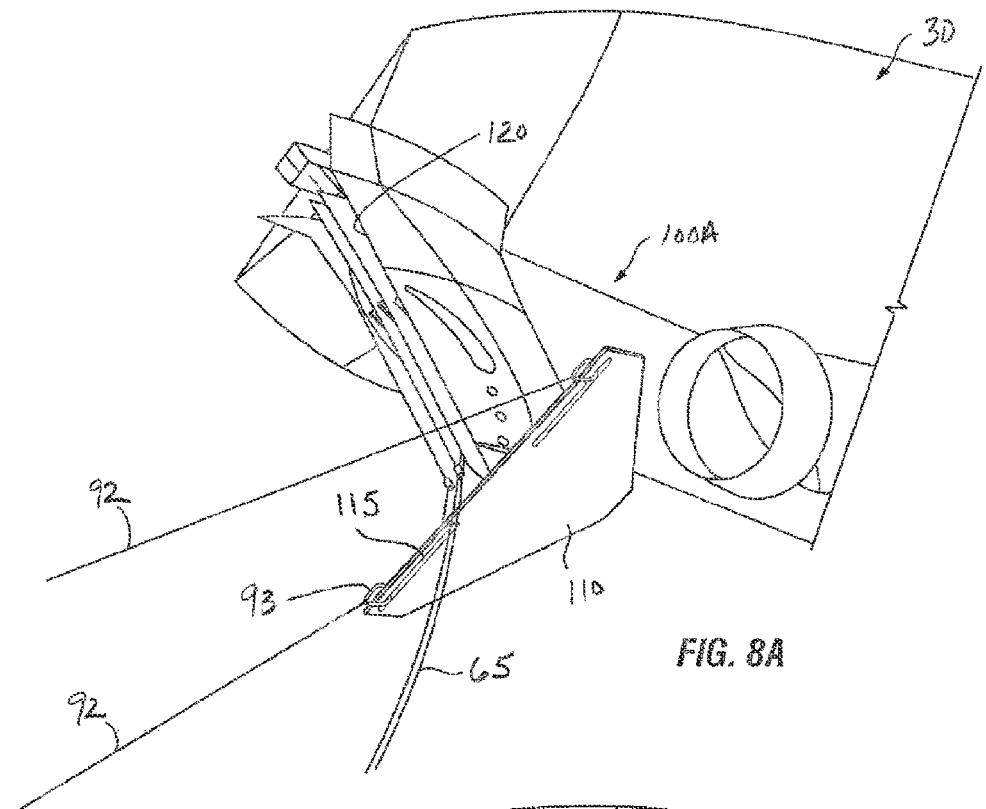
FIGS. 8A-8B show embodiments of a skeg having adjustable tow points.
Figure 8B:
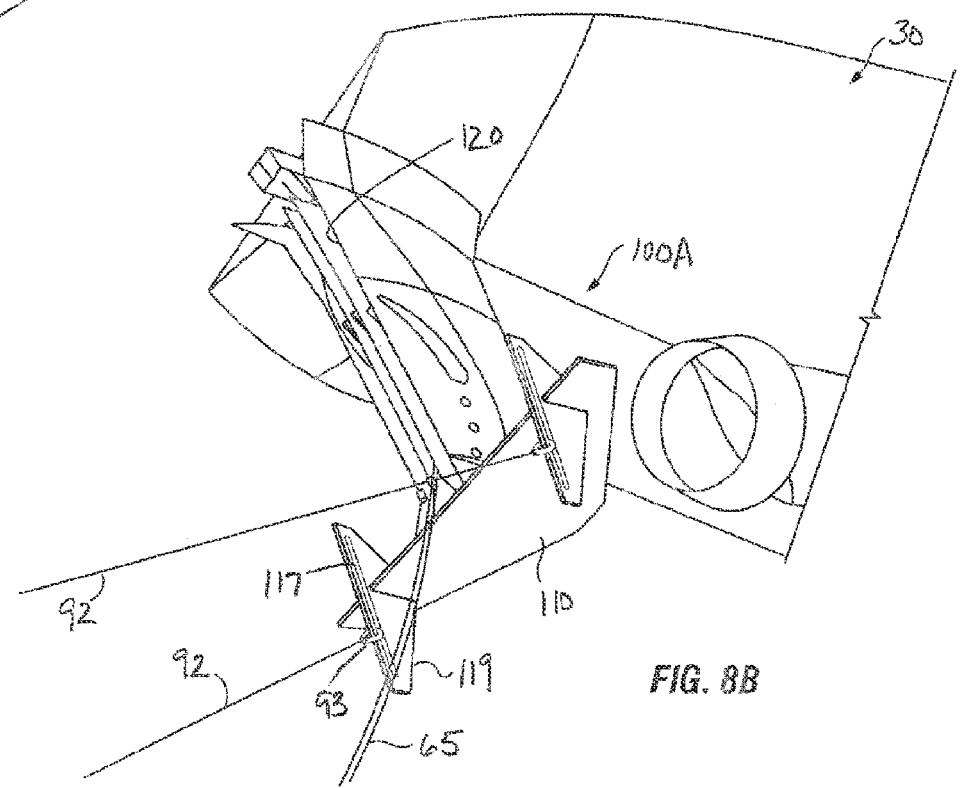

In previous examples, the skeg has tow points that are fixed. As an alternative, FIGS. 8A-8B shows arrangements for a skeg 100 having adjustable tow points for the connection of tow lines. In FIG. 8A, the base 110 has slots or coupling points 115 that allow coupling members 93 on the end of the tow lines 92 to be adjusted or to automatically adjust horizontally on the base 110. In FIG. 8B, the base 110 has slots or coupling points 117 on fins or turrets 119 that allow coupling members 93 on the end of the tow lines 92 to be adjusted or to automatically adjust vertically on the base 110.

As shown, the slots or coupling points 115 and 117 can allow the coupling members 93 to ride freely therein for automatic adjustment. The actual position of the two lines 92 can be adjusted elsewhere in the system using any of the various devices disclosed herein. Rather than being elongated, the slots or coupling points 115 and 117 can have a number of preconfigured set positions for pre-adjustment of the tow lines 92. Moreover, both vertical and horizontal adjustment of the two points on the skeg 100A can be achieved by combining the features of both FIGS. 8A-8B. As such, the vertical fin or turret 119 with the vertical slot or coupling point 117 can ride or affix in a horizontal slot or coupling point 115 on the base 110. In combination then, the two points for the tow lines 92 can be adjusted both vertically and horizontally.

D. Flotation Systems for Source or Other Components

As noted previously, embodiments of the marine seismic survey systems can use a horizontal source. FIGS. 9A-9D show arrangements of marine seismic survey systems 10B using horizontally configured sources 250 towed off the skeg 100 on the tow vessel 30. As shown, each source 250 in these embodiments is an air gun array and has gun plates 252 interconnected by lines 254. In addition, each source 250 connects by a towline 220 and a buoyant supply line 230 to the skeg 100 on the vessel 30 according to the techniques discussed previously. Each source 250 in turn positions relative to a streamer cable 65 extending from the skeg 100 and supported by a towline 62.

Although not shown in FIGS. 9A-9D, the skeg 100 can support more than one source 250 and floatation devices 200A-D behind the vessel in a way similar to that shown in FIG. 4A. Additionally, the floatation devices 200A-D can support other types of sources, such as electromagnetic source, magnetic source, sonar device, or sound generating device, and can support other components of the system, such as paravanes, acoustic devices, imaging devices, streamers, or the like. Furthermore, although one streamer cable 65 is shown in FIGS. 9A-9D, it will be appreciated with the benefit of this disclosure that multiple streamer cables 65 or an array of such cables 65 can be towed from the skeg 100.

When performing the survey, the source 250 is preferably stabilized at a predetermined or known depth in the water column.

When surveying in icy, obstructed, or even normal waters, the disclosed system 10B preferably uses floatation devices 200A-D as shown in FIGS. 9A-9D that tow below the surface of the water or are less subject to ice impacts, debris, or other issues at the water's surface.

1. Flotation Devices Using Buoys

Figure 9A:
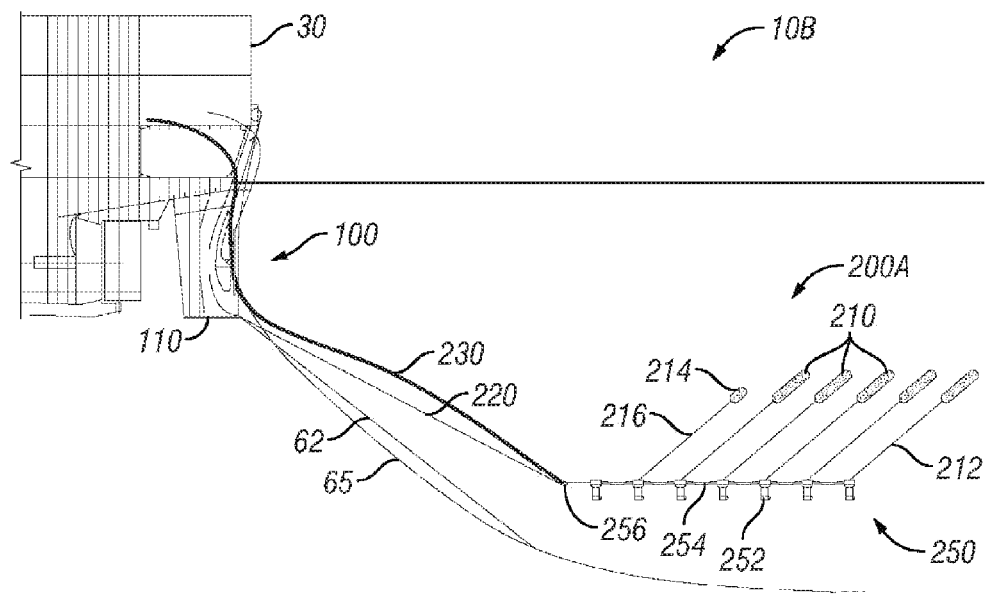
FIGS. 9A-9D illustrates flotation systems according to the present disclosure for a horizontal source towed behind a vessel with a skeg.

In FIG. 9A, a first floatation device 200A has individual buoys 210 that support the horizontal source 250. At least some of the source's plates 252 are individually connected to one of the buoys 210 by a cable 212. This allows each buoy 210 to move around and under ice, obstacles, or other elements at or below the water's surface. In general, the buoys 210 may be allowed to float at the surface. In the device 200A in FIG. 9A, however, the buoys 210 are preferably set up to float below the surface of the water when towed behind the skeg 100. Because the skeg 100 brings the tow and supply lines 220/230 below the water's surface, the source 250 and buoys 210 can be better supported below the surface of the water and away from any ice floes.

To reduce issues with entanglement, the buoys 210 as shown can be tethered by short lines 212 so that they float at about 4-8 meters below the water's surface when towed. In general, the length of these lines 212 may be about 6-m, and the tow depth of the source 250 may be about 19-m.

In addition to shorter lines 212, not all of the source plates 252 may be supported by a buoy 210 and a line 212. In this example, a first source plate 252 can be supported on its own between the coupling 256 of the tow and supply lines 220/230 to the source 250. A shorter front buoy 214 and line 216 can then support the second source plate 252, and the remaining five source plates 252 can be supported by the larger buoys 210 and longer lines 212. The smaller buoy 214 may have a length of about 1-m., while the larger buoys 210 have a length of about 2.5-m. In other arrangements, each source plate 252 can having its own buoy 210 connected by a line 212. Additionally, the coupling 256 of the towline 220 and supply line 230 to the source 250 can be supported by its own buoy and line (not shown).

When towed behind the skeg 100, the buoys 210/214 submerge. This provides stability to the buoys 210/214 and reduces issues with them wandering about and being impacted by ice floes or other elements at the water's surface. Although initially unexpected, the source 250 can actually float at a substantially consistent depth while being supported by the individually tethered buoys 210/214. In essence, the interplay between the drag from the submerged buoys 210/212, the tow speed, the holding off of the source 250 from the skeg 100, and other factors make the source 250 neutrally buoyant in the water. Using more or less buoys 210/214 can aid in stabilizing the depth of the source 250 depending on the implementation.

Figure 9B:
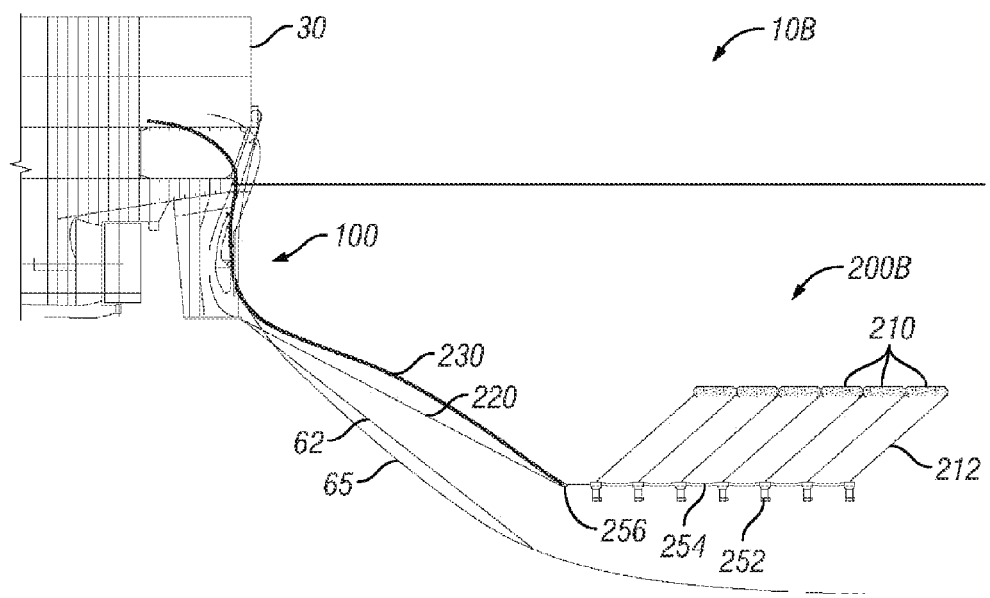

To stabilize the depth of the source 250, the floatation device 200B in FIG. 9B has the buoys 210 arranged together in a horizontal manner. The number of buoys 210 used can be adjusted so that the source's buoyancy will be neutral. In this arrangement, the multiple buoys 210 are tethered at one end by lines 212 to individual gun plates 252 of the source 250, and the other ends of the buoys 210 connected to the ends on the adjacent buoys 210. Thus, each buoy 210 is flexibly connected to the adjacent buoys 210. As an alternative to flexibly connected buoys 210, the floatation device 200B may use one single elongated buoy (not shown) held by tether lines 212 and intended to float below the water's surface when towed.

2. Buoys

Figure 10A:
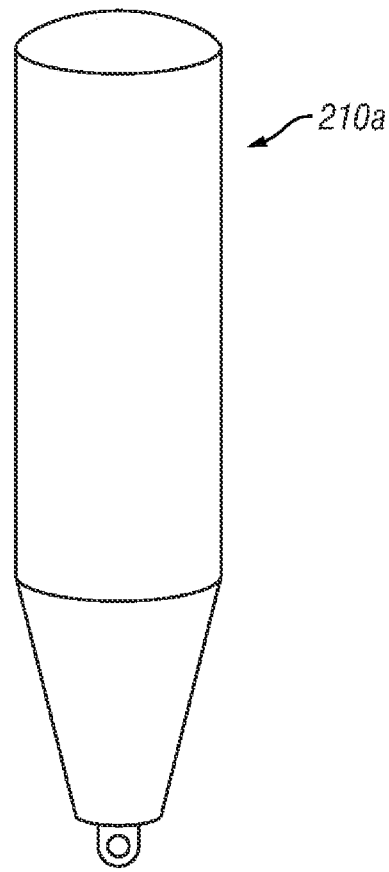
FIGS. 10A-10B illustrate buoys for the floatation systems according to the present disclosure.
Figure 10B:
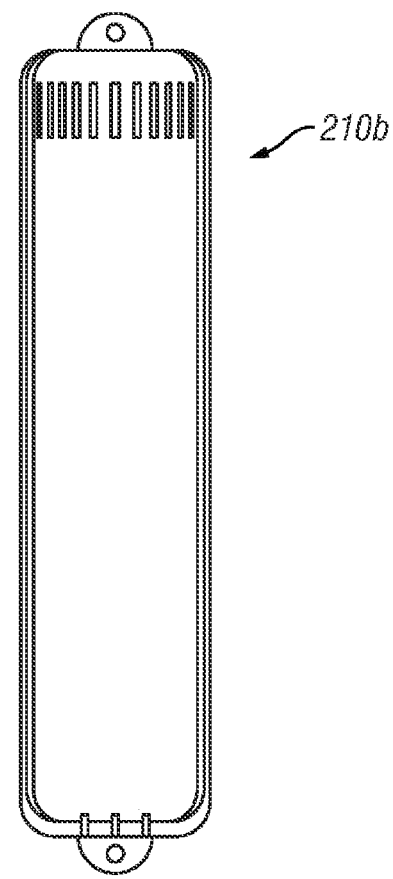

The particular buoys 210 used for the floatation devices 200A-B of FIGS. 9A-9B preferably produce little drag and shed ice or other surface elements. In addition, the buoys 210 are preferably resilient to cold water and can handle impacts with ice or other surface elements. In FIG. 10A, one buoy 210a is shaped as an elongated spar and has a cylindrical body with a tapered end intended to reduce drag and cut through ice floes and water. In FIG. 10B, another buoy 210b has a cylindrical body.

The construction of these buoys 210a-b can be similar to that used for ice spar buoys typically used to mark navigation channels in areas that freeze in winter. One manufacturer of such an ice spar buoy is Sabik of Finland. When used to support a source (250), these types of buoy 210a-b can function well in icy waters.

On both of these buoys 210a-b, a front coupling at the end can connect the buoy 210a-b by a tether line (not shown) to the source (not shown). Another coupling may be provided on the other end to facilitate handling of the buoy 210a-b or to tie it to other buoys as in the arrangement of FIG. 9B. In general, the buoys 210a-b may be about 2.5-m in length or shorter and may be about 0.5-m in width, and the buoys 210a-b may be designed to provide approximately 25% reserve buoyancy.

For both buoys 210a-b, the bodies are preferably formed out of an outer shell of strong plastic material, such as Ultra-High Molecular Weight Polyethylene (UHMWPE) or UV polyethylene that will resist cracking, chipping, and peeling in cold conditions. The wall thickness is preferably 20-mm or more. Internally, the buoys 210a-b can have reinforcement such as ribs or plates, and the buoys 210a-b may be filed with closed cell foam, such as polyurethane foam.

3. Flotation Device Using Drogues

Figure 9C:
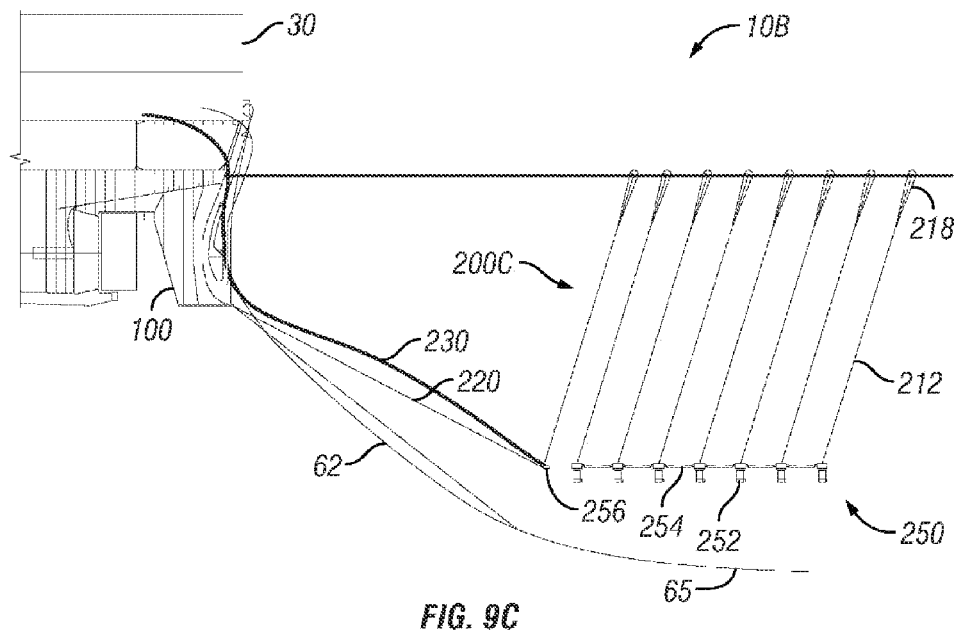

In yet another arrangement, the floatation device 200C in FIG. 9C uses chutes or drogues 218 connected by lines 212 to support the source 250. These drogues 218 are designed to drag along the surface while the source 250 is towed. Should the drogues 218 impact with any ice floes or other surface elements, the individual drogue 218 can absorb the impact and then return to catching water at the surface without significantly disrupting the support of the source 250 by the other chutes 218. As also shown, the coupling 256 of the source 250 to the tow and supply lines 220/230 can be supported by a drogue 218 and line 212 as well.

4. Depth Controlled Floatation Device

Figure 9D:
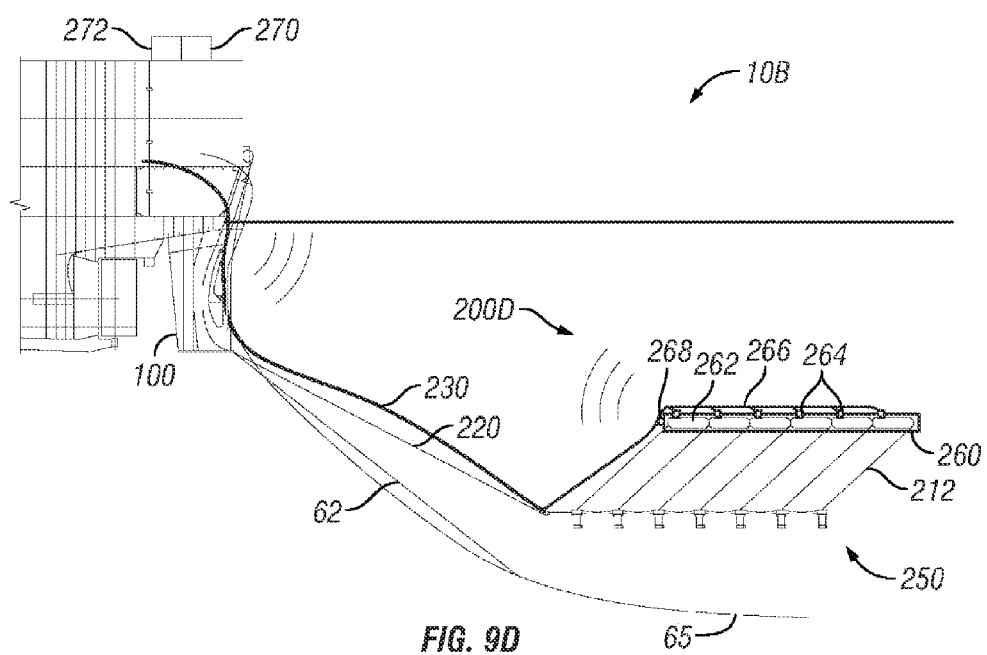

As another alternative, the floatation device 200D in FIG. 9D uses an elongated float 260. Internally, this float 260 is compartmentalized by several volumes (e.g., bladders or chambers) 262 along its length. As opposed to an elongated, compartmentalized float as shown, the floatation device 200D may comprise several individual floats either individually tethered or flexibly connected together (as in FIGS. 9A-9B), and one or more of these floats can have a fillable volume for buoyancy control.

When the float 260 is towed behind the skeg 100, these volumes 262 can be selectively inflated or flooded as required to maintain a desired depth for the source 250. For example, a tap off line 266 from the source's supply cable 230 connects to regulators 264 for each of the volumes 262. The regulators 264 can add or release air in the volume 262 to control the buoyancy of the float 260. In this way, the float 260 can be maintained at a desired level and remain unaffected by surface obstructions or wave action. In another example, the regulators 264 can be high-pressure water pumps, and the volumes 262 can be filed with pressurized air and/or water that can be controlled.

In either case, a controller 268 monitors and controls the operation of the regulators 264, and the controller 268 can connect to depth indicators on the source plates 252 to determine and monitor the depth and orientation of the source 250. In turn, the controller 268 can adjust the volume of air in the volumes 262 from the source's supply line 230, which ultimately comes from a pressure source 272 on the vessel 30 for supplying pressurized air to the source 250.

As is known, the buoyancy of the device 200D can depend on the salinity of the water, the temperature, and other factors so the controller 268 may preferably be capable of local or remote control. Although GPS would not work to position the float 260, the controller 268 can communicate with a control unit 270 on the vessel 30 by acoustic signals or an electric cable on supply line 230 so that the control unit 270 can operate the controller 268 to change and adjust the position (i.e., depth) of the float 260 during surveying. This flotation device 200D can also incorporate components related to a Remotely Operated Towed Vehicle or glider buoy and any buoyancy, pitch, and roll control components disclosed herein.

a. Depth Controlled Flotation System

As noted above in FIG. 9C, the float 260 can comprise several individual floats either individually tethered or flexibly connected together, and one or more of these floats can have a fillable volume for buoyancy control. When towed behind the skeg 100, the volume can be selectively inflated or flooded as required to maintain a desired depth for the source 250.

Figure 11A:
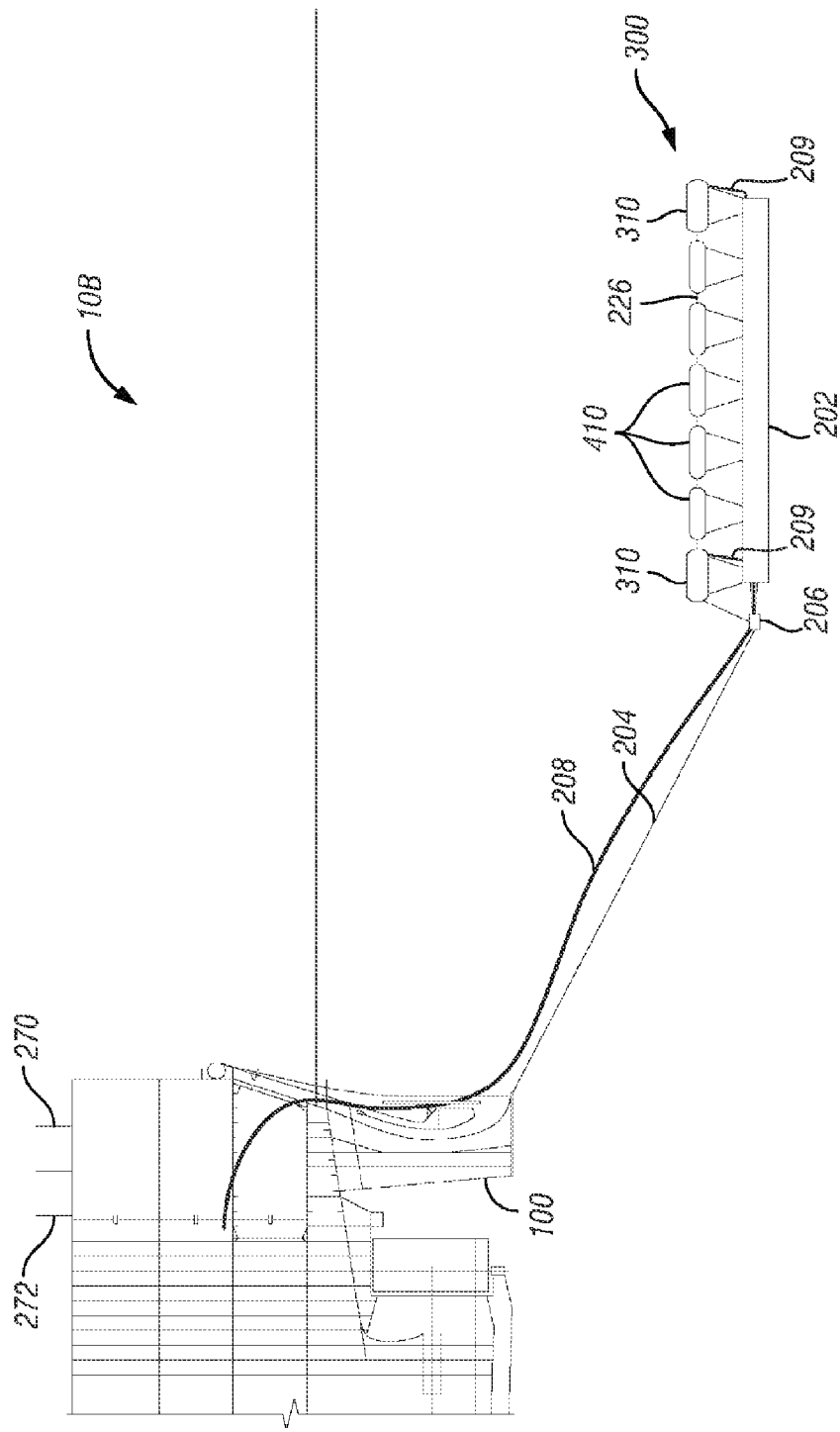
FIG. 11A illustrates another floatation system according to the present disclosure for a source.

As one example, FIG. 11A illustrates a floatation system 300 for a component 202 towed by the vessel 30 with a tow line 204 from the skeg 100. The towed component 202 can be a seismic source, an air gun source, electromagnetic source, magnetic source, sonar device, sound or imaging device, a paravane, or other towed component.

This system 300 uses a number of floats or buoys 310 and 410 interconnected together. At least one of the floats 310 is depth controlled, meaning that the buoyancy of the float 310 is actively controlled. For example, this float 310 can have its depth within the water column automatically controlled at the float 310 and/or operationally controlled from the vessel's control unit 270. User interface screens for monitoring the depth controlled float 310 can be accessed on a monitor associated with the vessels' control unit 270. In this way, operators on the vessel 30 can use the screens to monitor the operation of the depth controlled float 310 and read its measured parameters, such as depth, air pressure, humidity, temperature, and the like. Also, operators on the vessel 30 can adjust the operating parameters of the float 310, such as changing the controlled depth for operation. This may be especially useful to alter the seismic operations or to dive the source deeper in the water column to avoid a surface obstruction.

One or more second floats or buoys 410 have adjustable buoyancy and are tethered to the depth controlled float 310. These adjustable buoyancy floats 410 have their buoyancy configured before deployment for a particular implementation. For example, the buoyancy for each of these floats 410 is configured for the towed component or portion of the towed component, which the float 410 is used to support. In the present example, each of these floats 410 can having its buoyancy preconfigured to counterbalance of the weight in water of the associated air gun 252 that the float 410 supports in the air gun array 250.

As shown, at least one depth controlled float 310 is preferably disposed first in line with the one or more second floats 410 tethered behind and intended to follow the lead of the first float 310. The connections 226 between each of the floats 310 and 410 are preferably flexible allowing the various floats 310 and 410 to move relative to one another.

Other configurations can be used. For example, another depth controlled float 310 can be disposed at the end of the set of adjustable floats 410, as shown in FIG. 11A. Accordingly, the flotation system 300 can have one or more of the depth controlled floats 310 and one or more of the adjustable floats 410 in any desired arrangement.

One or more lines 209 from a supply cable 208 connect to the one or more depth controlled floats 310. Pneumatic fluid from a pneumatic fluid source 272 on the vessel 30 communicates through the supply cable 208 and lines 209 to the floats 310 for filling internal volumes. Preferably, the pneumatic fluid is pressurized air, but other gaseous fluids can be used. Also, the pneumatic fluid can be a liquid lighter than water. Yet, the liquid should not be exhausted to the marine environment unless safe to do so. Thus, in some arrangements, a return line (not shown) from the floats 310 may run back to the source 272 on the vessel 30.

Internally, each of the one or more floats 310 has a controller (not shown) described below that regulates the pneumatic fluid (air) contained in the floats 310 and controls the floats' buoyancy in the water column. In this way, the floats 310 can be maintained at a desired level and can adjust to other levels as needed. Not only does this allow the floats 310 to remain unaffected by surface obstructions or wave action if present, the floats 310 can support the towed component 202 at a consistent depth, which can simplify data acquisition as discussed herein. Additionally, the floats 310 can divert the towed component 202 to a greater depth while being towed to avoid any obstructions on the water's surface, such as ice keels and the like.

Figure 11B:
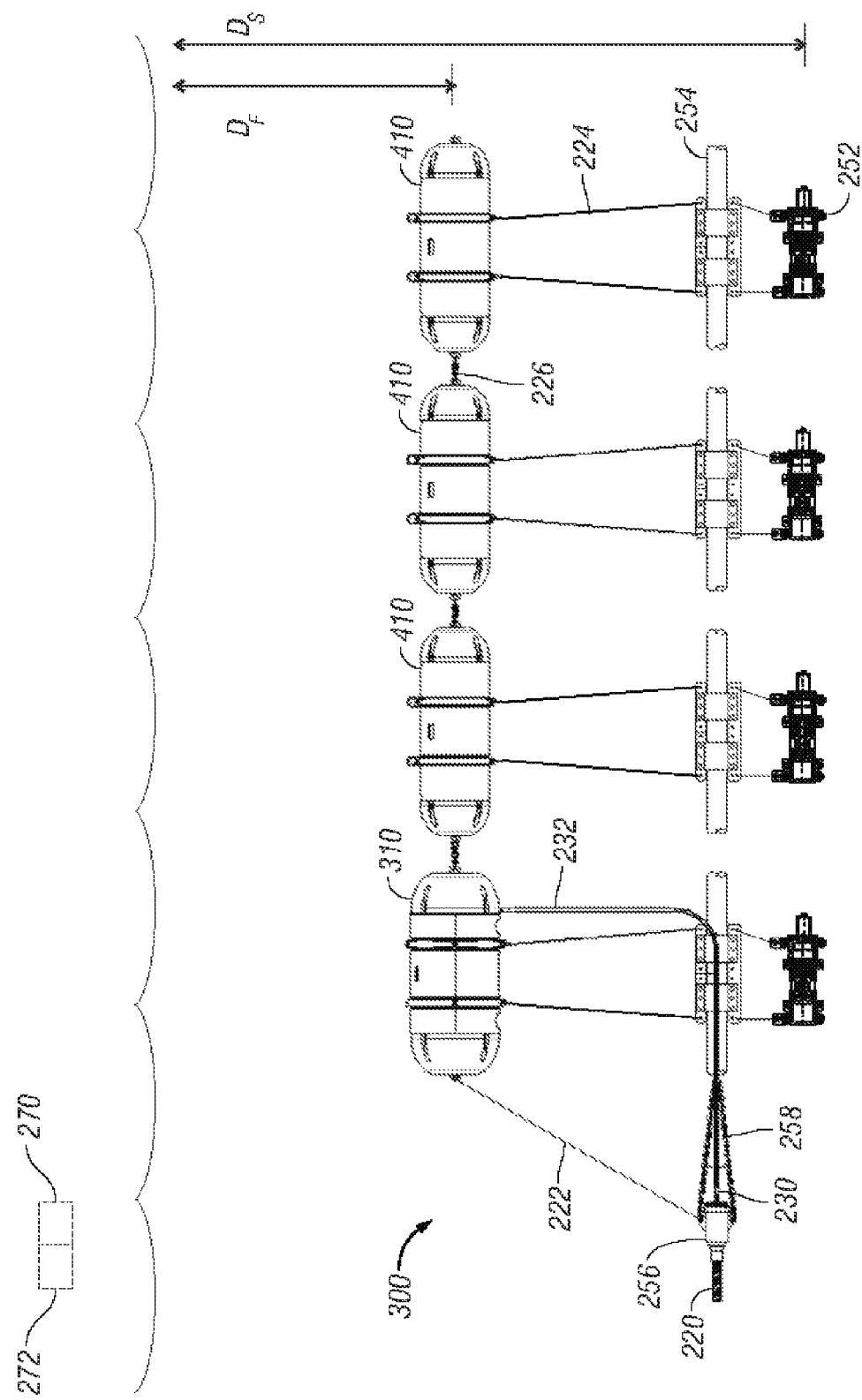
FIG. 11B illustrates an embodiment of the flotation system of FIG. 11A.

Turning now to FIG. 11B, an embodiment of the flotation system 300 of FIG. 11A is shown in more detail. As noted above, the system 300 has one or more depth controlled floats 310 and one or more adjustable floats 410 tethered together by tether lines 226. As before, the system 300 can be towed behind a vessel (not shown) by a tow line 220 connected to the vessel's skeg (not shown), and the system 300 can be used to support a towed component and can connect by a supply line 230 to a pneumatic fluid source 272 on the vessel 30. In this embodiment, the towed component is an air gun array 250 towed in the water and connected by a tow line 220 and an air supply line 230 to a pressurized air source 272 on the vessel (not shown).

The depth controlled float 310 connects to the tow line 220 with a tether 222, and each float 310 and 410 supports portions of the air gun array 250 with tether lines 224. A tap off line 232 from the air supply line 230 connects to the depth controlled float 310 and supplies the pressurized air needed to control the depth $D_F$ of the system 300 and by extension the depth $D_S$ of the source 250 during operations detailed below.

i. Depth Controlled Float

FIGS. 12A-12D illustrate side, cross-sectional, end sectional, and exploded views of the depth controlled float 310 of the system 300 in FIG. 11B. The float 310 includes end caps 320A-B, a main body 330 composed of two halves 332A-B, an air tank or chamber 336 held in the main body 330, an inlet valve 340 for the tank 336, exhaust valves 350 for the tank 336, a pendulum valve assembly 360 for the tank 336, and a controller 370 for the float 310.

Straps having two halves 314A-B composed of metal and having rubber bonded inside affix together and hold the two halves 332A-B of the main body 330 together around the air tank 336. The end caps 320A-B affix to the ends of the main body 330 to enclose the air tank 336. To affix the end caps 320A-B, tie rods 312 can pass through the periphery of the main body 330 and connect the end caps 320A-B to each end of the main body 330. Preferably, tubes are provided for the tie rods 312 through any internal foam of the components for clear passage of the tie rods 312 during assembly and disassembly.

Each end cap 320A-B has an outer shell 322 surrounding foam 324 or other buoyant material. The shell 322 is composed of suitable material, such as fiber-reinforced plastic. A tie rod 326 with an eyelet at its end for connecting to a tether line disposes through the end cap 320A-B and connects to a metal plate 323 on the inside surface of the end cap 320A-B that rests against the main body 330. Preferably, the tie rod 326 has a weldment 328 to help secure the foam 324 in the end cap 320A-B to the tie rod 326.

Externally, the end caps 320A-B preferably have protective wear plates 327 where eyelets of the tie rods 326 extend from the end cap 320A-B. The float 310 connects to tow lines using the tow eyelets on the end tie rods 326, and the desired towed component to be supported by the float 310 (e.g., one of the air guns) connects to the pad eyes on the clamps 314B. Other pad eyes on the upper clamp member 314A are used for lifting the float 310 during installation and the like.

One of the end caps 320B holds the controller 370 in a pressure enclosure 372, and a control panel 371 seals the controller 370 therein. The control panel 371 includes a marine bulkhead connector for connecting to the tap off line (232: FIG. 11B) from the source's supply cable (230). The control panel 371 also includes a cable connector for connecting to external electronics, such as sensors on the air gun (252: FIG. 11B) and to the vessel's control unit (270: FIG. 11A).

The controller 370 inside the enclosure 372 includes a high-pressure regulator, control board, pressure sensor, ports, operating valves, operating coils, check valves, and various fittings as discussed in more detail below. The metal plate 323 of the end cap 320B also has a bulkhead 325 (FIG. 12D) disposed on its inside surface for fittings and hoses for the air tank 336 and other components as discussed below.

Similar to the end caps 320A-B, the two halves 332A-B of the main body 330 each have an external shell 333 and internal buoyant material 334, which can be composed of foam, such as 1500-CM-A, 35.0 pcf; 8.8 cu. ft. (301 lb). Externally, the tank 336 has an air inlet valve 340 and air exhaust valves 350 disposed on the top of the tank 336 and has the pendulum valve assembly 360 disposed on its bottom surface. Gratings 316 fit in openings of the main body 330 as protective covers for these various components.

Figure 12A:
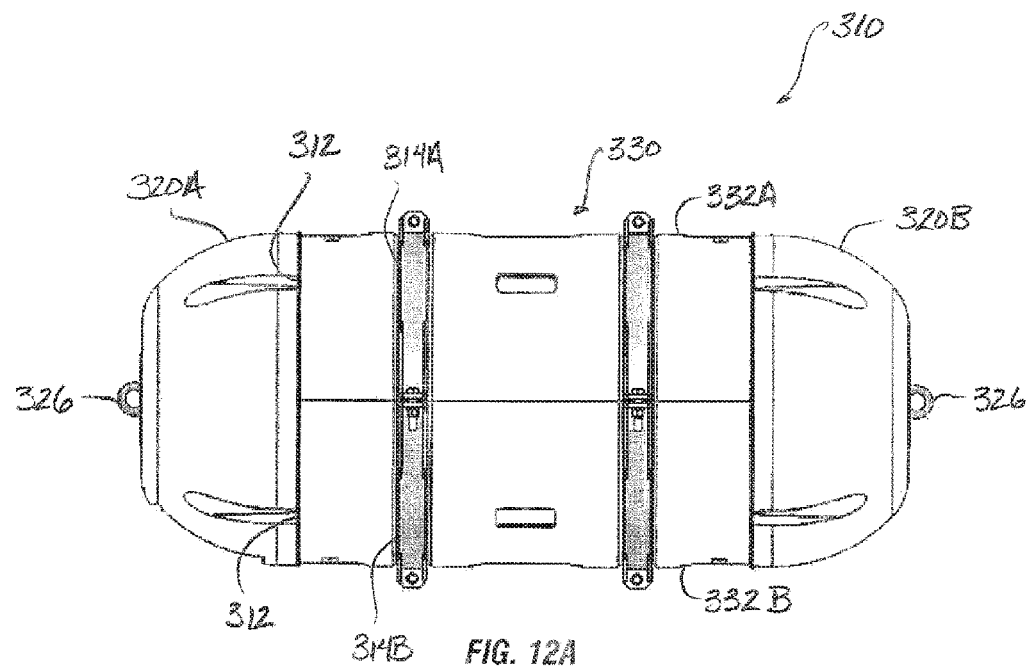
FIGS. 12A-12D illustrate side, cross-sectional, end sectional, and exploded views of a depth controlled float of the system in FIGS. 11A-11B.
Figure 12B:
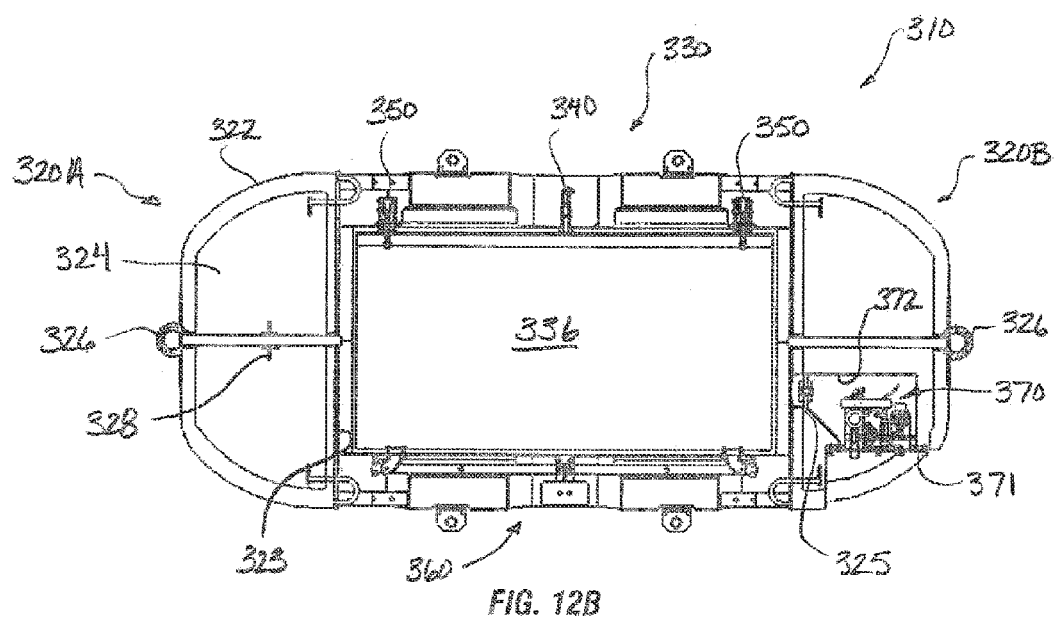
Figure 12C:
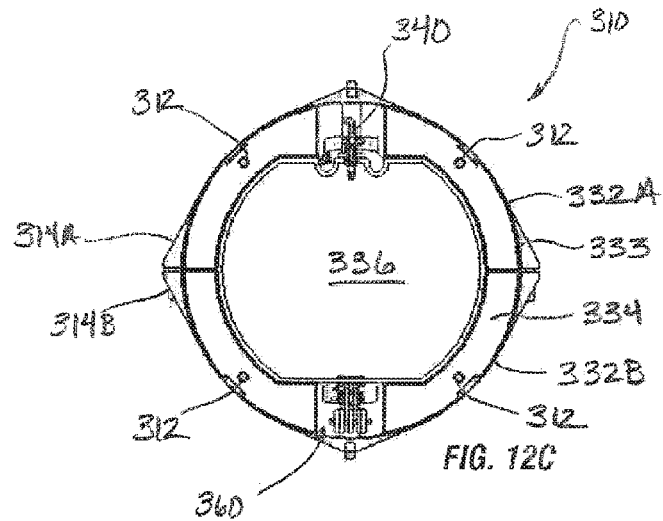
Figure 12D:
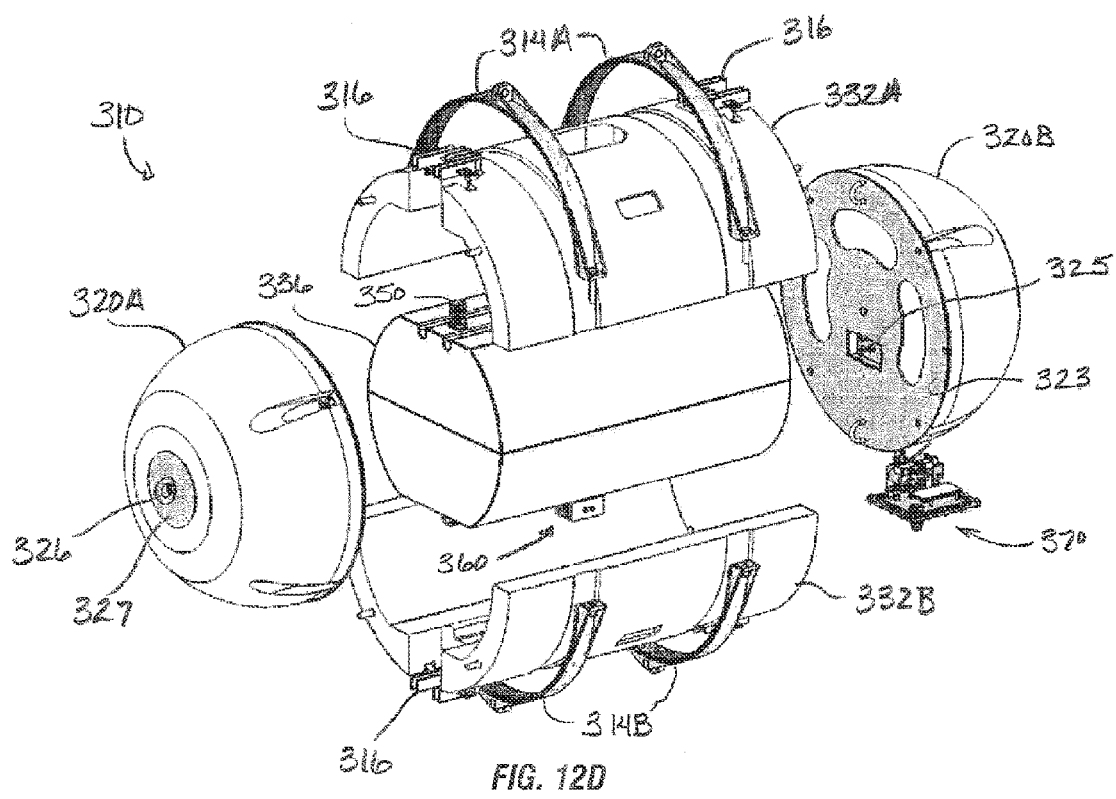
Figure 13A:
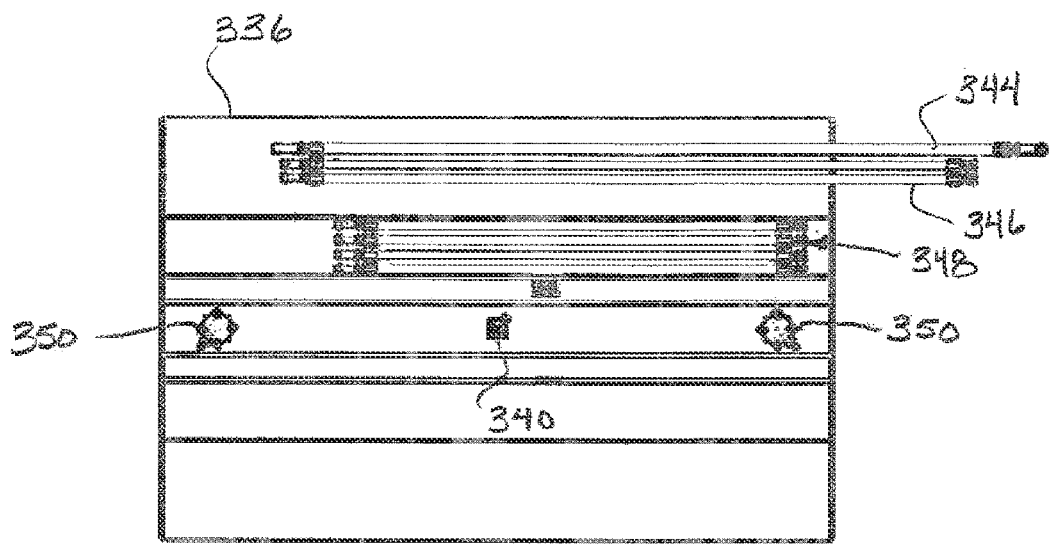
FIGS. 13A-13B illustrate the tank of the depth controlled float in FIGS. 12A-12D.
Figure 13B:
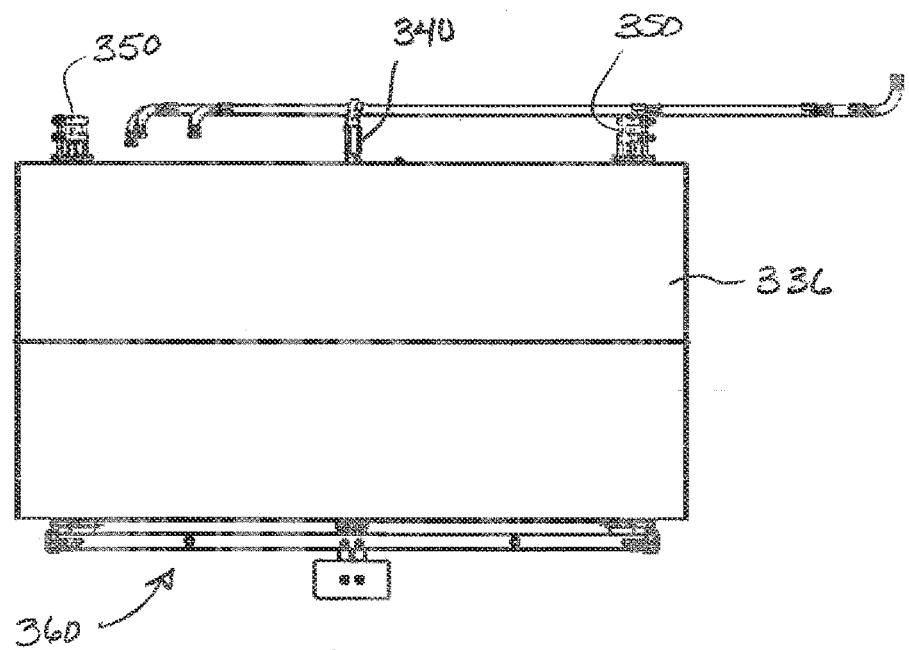

FIGS. 13A-13B show top and side views of the air tank 336 in isolation and reveal details of the valves 340/350 and pendulum valve assembly 360. A number of air hoses are also shown, but they are not shown connected to the various components. In general, an air fill line 344 connects from the controller's bulkhead (325: FIG. 12D) on the end cap (320B) to the inlet valve 340 on the air tank 336 to fill the tank 336 with air. Main lines 346 connect to the controller's bulkhead (325: FIG. 12D) and connect to tee lines 348 to the exhaust valves 350 on the tank 336.

FIGS. 13C-13D illustrate side and cross-sectional views of an exhaust valve 350 for the depth controlled float (310). The exhaust valve 350 include a piston 352 movable in a cylinder 353 by air supplied through ports 351A-B. The cylinder 353 fits atop a ported plate 358 that seals onto an exhaust port (not shown) in the top of the air tank (336) using seals, washers, and the like.

The piston 352 of the cylinder 353 affix to the end of a rod 354, which passes through a port 359 in the ported plate 358. The rod 354 has a seal element 356 that can seal the port 359 closed. A spring 355 biases the rod 354 so that the seal element 356 rests against the port 359 to keep the valve 350 normally closed.

To further seal pressurized air in the tank (336), the piston 352 when forced by pressurized air from the cylinder's port 351A presses against the seal element 356 to definitively close off fluid communication through the port 356. By contrast, pressurized air from the cylinder's other port 351B moves the piston 352 upward in the cylinder 353 and releases the engagement of the seal element 356 so air in the tank (336) can pass out of the port 359 to the surrounding environment.

FIGS. 14A-14C illustrate perspective views of the pendulum valve assembly 360. As noted above, the pendulum valve assembly 360 mounts to the bottom of the tank (336) at water ports. As described in more detail below, the pendulum valve assembly 360 prevents air from escaping the tank (336) through the water ports when the tank (336) is tilted.

The assembly 360 has a weight 366 attached to parallel connecting rods 364 with rotatable fittings 365A and attached to a mounting plate 362 with rotatable fittings 365B. The parallel connecting rods 364 are affixed to move together when the pendulum weight 366 pivots in one direction or the other about the mounting plate fittings 365B. At each end of the connecting rods 364, the assembly 360 has poppet valves 368a-b actuated by the movement of the rods 364 and the weight 366. The poppet valves 368a-b are normally open and connect to the water ports (not shown) in the tank (336) with elbow connections 369a-b so water can flow in and out of the tank (336) through the poppet valves 368a-b.

In operation, the weight 366 is pulled by gravity and tends to orient downward, regardless of the tilting of the float (310). When the float (310) does tilt due to an attitude change, the downward-oriented weight 366 shifts the rods 364 in relation to the tilt. Thus, if the float (310) dips or dives forward, the weight 366 orients downward relative to the tilt and pushes the rods 364, which shift forward to the front of the assembly 360. When this occurs, the rods 364 close the back poppet valve 368b, which will prevent air from escaping the tank's water port at this location on the tank (336). The reverse is also true for tilting of the float (310) in the opposite direction.

ii. Adjustable Buoyancy Float

FIGS. 17A-17D illustrate side, exploded, and two cross-sectional views of the adjustable float 410 of the system 300 in FIG. 11A. Similar to the depth controlled float 310 discussed above, the adjustable float 410 includes end caps 420A-B and a main body 430. Straps 414 composed of metal dispose on the main body 430. The straps 414 for the adjustable float 410 can be one-piece as shown and may have rubber bonded to the inner surface.

The end caps 420A-B affix to the ends of the main body 430 using tie rods 412 that pass through the periphery of the main body 430 and connect the end caps 420A-B to each end of the main body 330.

Each end cap 420A-B has an outer shell 422 filled with a foam 424 or other buoyant material. A tie rod 426 with an eyelet at its end for connecting to a tether line disposes through the end cap 420A-B and connects to a metal plate 423 on the inside surface of the end cap 420A-B that rests against the main body 430. Preferably, the tie rod 426 has a weldment 428 to help secure the foam 424 in the end cap 420A-B to the tie rod 426.

Externally, the end caps 420A-B preferably have protective wear plates 427 where the eyelets of the tie rods 426 extend from the end cap 420A-B. The float 410 connects to other floats using the tow eyelets on the end tie rods 426, and the desired apparatus to be supported by the float 410 (e.g., one of the air guns) connects to the pad eyes on the straps 414. Lifting hoops on the straps 414 are used for lifting the float 410 during installation and the like.

The main body 430 has an outer shell 432 surrounding buoyant material 434, which can be a 29 pcf foam. Rather than holding an air tank, the main body 430 has a hollow core 436 that holds a plurality of buoyancy elements 440 and/or spacers 450. Each of the buoyance elements 440 has a foam insert 442 is surrounded by a reinforcing rim 444. The foam insert 442 can be composed of 29 pcf foam, and the rim 444 can be a section of ¾ sch40 PVC pipe. The spacers 450 do not have foam and are instead simply neutral rings, which can be made from sections of HDPE pipe and with dimensions of 18" OD×7.75" long, for example.

The buoyant force provided by the float 410 when disposed in water can be adjusted or "trimmed" using the buoyant elements 440 and spacers 450. One (or both) of the end caps 420A-B can be removed from the main body 430, and the hollow core of the main body 430 can filled with the desired ratio of buoyant elements 440 and spacers 450. If a minimum buoyancy is desired, the main body's hollow core can be left empty. Increased buoyancy can be achieved by adding buoyant elements 440 and filling any remaining space with the neutral spacers 350. For full buoyancy, the hollow core of the main body 430 can be entirely filed with the buoyant elements 440.

For example, the hollow core 436 can have space for seven elements. The maximum buoyance can be 670-lbs. with all of the spaces filled with buoyant elements 440. This would equate to a maximum weight in air of about 1030-lbs. Intermediate buoyance values for the float 410 can then range from about 630-lbs. (six buoyant elements 440 and one spacer 450) to about 425-lbs. (one buoyant element 440 and six spacers 450) with intermediate values therebetween. The minimum buoyancy can be 389-lbs. when the hollow core is empty.

The buoyancy for each of the adjustable floats 410 is configured for the particular air gun or portion of the source array that the float 410 is set to support. The gun is weighed in water, or its weight in water is calculated. The buoyancy for the float 410 is then configured to counterbalance the weight of the supported gun in water.

iii. Operation of the Depth Controlled System

With an understanding of the depth controlled float 310 and adjustable floats 410 of the system 300, discussion now turns to how the depth of the float 310 (and by extension the depth of the adjustable floats 410 and the system 300) can be controlled during operation.

FIG. 16A illustrates a schematic of the pneumatic control system for the depth controlled float 310. The tap off line 232 feeds pressurized air, gas, or other fluid from the source's pressure source (e.g., 272: FIG. 11A) to the pressure enclosure 372 of the buoy's controller 370. As noted above, the line 232 can connect from the source line for an air gun array so that the pressurized air may be at 3000 psi. A pressure regulator 373 regulates the pressure so that a lower pressure can be used to adjust the buoyancy of the float 310. For example, the regulator 373 may provide 100 psi air for operation. The pressure enclosure 372 can have a check valve 378 on the bulkhead 325 that permits excess pressure to be expelled to the environment.

Inside the pressure enclosure 372, the source air connects to a 2-by-2 way direction control valve 374 actuated by a fill solenoid $S_F$ of the buoy's controller 370. Air communicated from the direction control valve 374 passes through the bulkhead 325 on the pressure enclosure 372 to the inlet valve 340 to fill the tank 336. The default condition of the fill control valve 374 is closed due to spring bias, but when the fill solenoid $S_F$ is activated, the fill control valve 375 passes the supply air therethrough. Thus, filling the tank 336 of the float 310 involves activating the fill solenoid $S_F$ so that the supply air from the regulator 373 enters the tank 336 through the inlet valve 340, which can use a check valve, disposed on the tank 336.

Inside the pressure enclosure 372, the source air also connects to a 4-by-2 way direction control valve 375 actuated by an exhaust solenoid $S_E$. Air communicated from the direction control valve 375 passes through the bulkhead 325 on the pressure enclosure 372 to the exhaust valves 350 to seal or open exhaust ports 335 on the tank 336. Air from inside the exhaust valves 350 also passes back to the control valve 375 so it can be expelled to the environment through check valves 376.

The default condition of the exhaust control valve 374 supplies supply air to the exhaust valves 350 so that they prevent air from escaping the tank 336. As noted above, for example, pressurized air is fed to the pistons 352 of the exhaust valves 350 so that the exhaust ports 335 on the tank 336 are sealed closed. When the exhaust solenoid $S_E$ is activated, however, the exhaust control valve 374 supplies the supply air to the pistons 352 of exhaust valves 350 so that the pistons 352 unseal the exhaust ports 335. When this occurs, air can escape from the tank 336 to the surrounding environment.

To adjust the buoyancy, the controller 370 fills the tank 336 with air so that the depth controlled float 310 will move up toward the surface in the water column. As air fills the tank 336, water ballast in the tank 336 exits the lower water ports 338 as shown in FIG. 15A. As noted previously, the poppet valves 368a-b (schematically depicted in FIG. 17A) on the pendulum valve assembly 360 are normally open and allow the water in the tank 336 to flow out the water ports 338.

By contrast, the float 310 can be lowered in the water. To do this, the exhaust valves 350 exhaust air from the tank 336 to the surrounding water so the float 310 will move down from the water's surface. As air leaves the tank 336, water ballast fills the tank 336 through the open poppet valves 368a-b and the water ports 338 as shown in FIG. 15B. When the tank 336 does not fill with air or exhaust air, the float 310 will remain neutral in the water column.

When the float 310 is tilted, the air and water in the tank 336 shifts. If tilted enough, air in the tank 336 could escape the water ports 338 in the bottom of the tank 336. To prevent this, the pendulum valve assembly 360 closes the uppermost poppet valve 368a-b on the upend of the tilt. As shown in FIG. 15C, for example, the upend poppet valve, which in this example is 368b, closes the water port 338 to prevent the escape of air from the tank 336. At the same time, all of the other valves 340 and 350 can operate as normal to lower and raise the float 310 in the water column even while tilted.

Figure 16B:
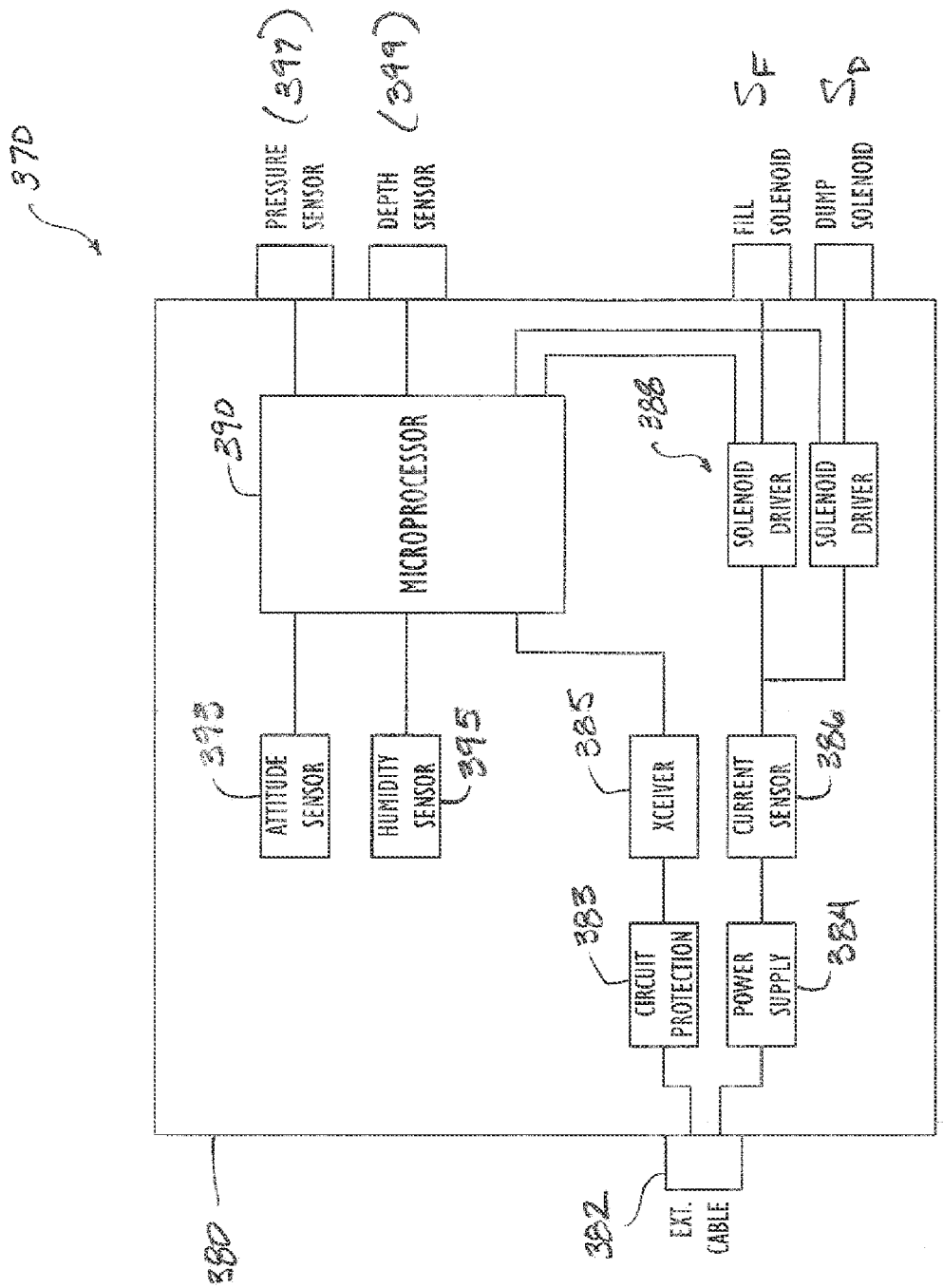
FIG. 16B illustrates a schematic of the controller for the depth controlled float in FIGS. 12A-12D.

In addition to the pneumatics discussed above, the controller 370 has electronic components to control the buoyancy of the float 310. FIG. 16B illustrates a schematic of the controller 370 for the depth controlled buoy. The controller 370 includes circuitry 380 having an external connector 382 for a control cable (not shown) from the vessel. Other connectors connect to the exhaust solenoid $S_E$ and the fill solenoid $S_F$ mentioned above, and connectors connect to pressure and depth sensors 397 and 399, which may be disposed elsewhere on the system, such as on the air gun array, and exposed to the surrounding water.

Internally, the circuitry 380 has circuit protection 383 connecting a transceiver to a microprocessor 390 so that the controller 370 can communicate remotely via the cable with the vessel's control equipment. A power supply 384 connects to a current sensor 386 and solenoid drivers 388 for activating the fill and exhaust solenoids $S_F$ and $S_E$ as described above. A pitch and roll attitude sensor 383, a humidity sensor 395, and external pressure and depth sensors 397 and 399 connect to the microprocessor 390, which processes the various inputs and controls the solenoid drivers 388 to control operation of the fill and exhaust solenoids $S_F$ and $S_E$ and raise and lower the float 310 and by connection the adjustable floats 410.

Figure 16C:
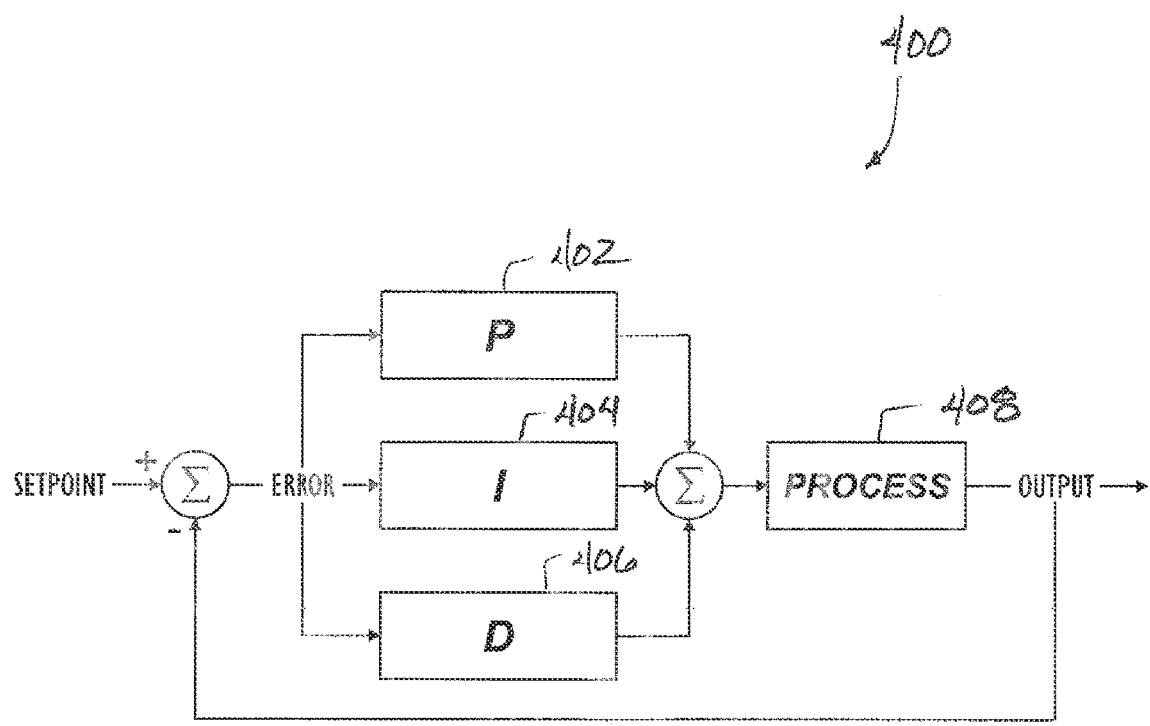
FIG. 16C illustrates a diagram of a control algorithm for the depth controlled float in FIGS. 12A-12D.
Figure 17C:
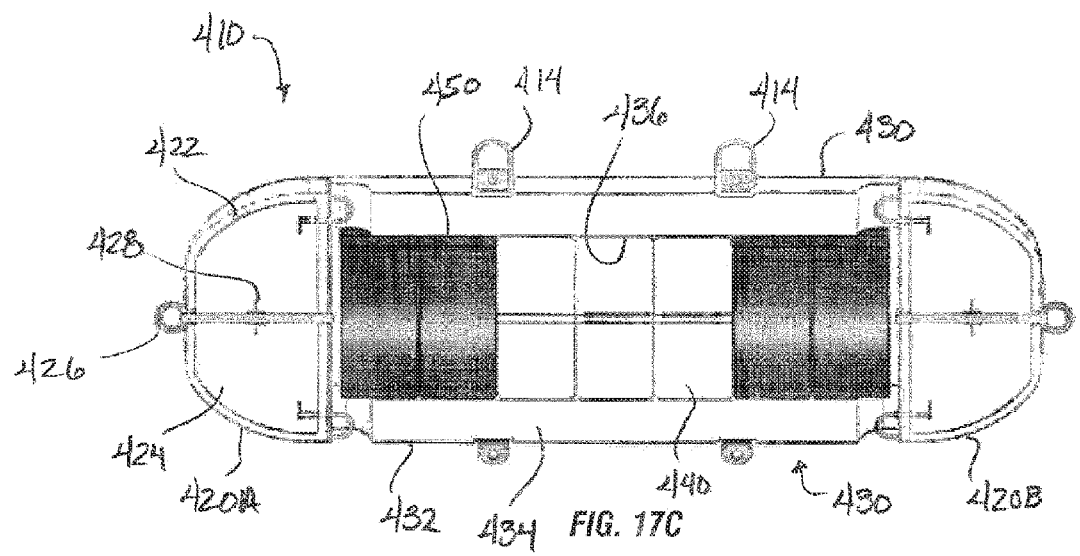
Figure 17D:
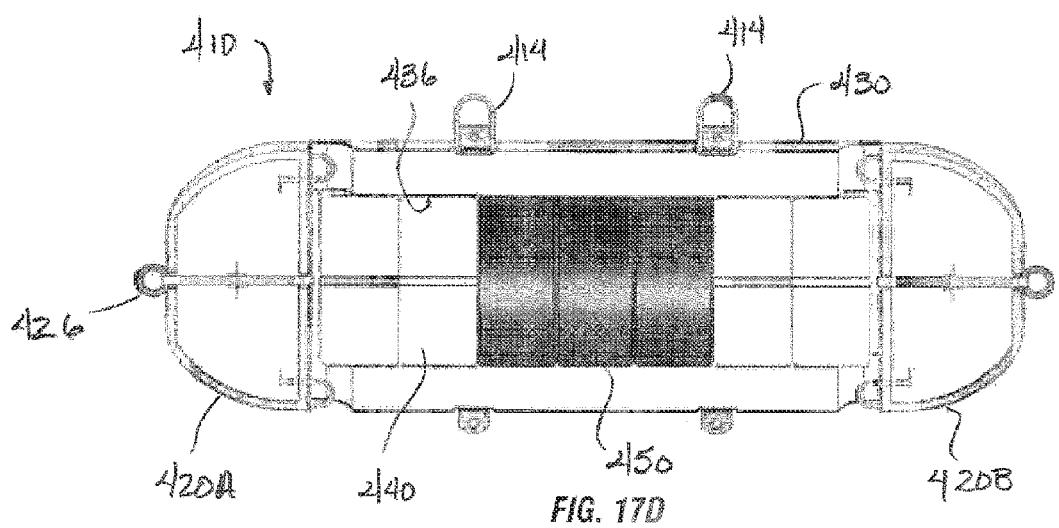

The microprocessor 390 can have conventionally components, such as analog-to-digital convertors, digital input/output interfaces, receivers, transmitters, processors, etc. In controlling the depth of the float 310, the microprocessor 390 of the controller 370 can use a proportion-integral-derivative (PID) control loop, such as diagramed in FIG. 16C. The PID control loop 400 is a feedback mechanism that calculates an "error" value as the difference between a measured process variable (e.g., measured depth) and a desired setpoint (e.g., set depth). Using the PID control loop 400, the controller (370: FIG. 16B) attempts to minimize the error by adjusting the process control inputs (i.e., amount of air in the float's tank).

The PID control loop 400 uses three separate parameters, which include a proportional value P as a present error (Block 402), an integral value I as an accumulation of past errors (Block 404), and a derivative value D as a prediction of future error based on the current rate of change (Block 406). The weighted sum of these three parameters is used to adjust the process (Block 408), which in this case is the up/down control of the fill and exhaust solenoids $S_F$ and $S_E$ performed by the controller (370).

E. Deployed Devices for Survey System

During marine seismic surveying, it is desirable to determine, track, and potentially control the positions of the streamers to better acquire and map the seismic data obtained. Determining position can be done using GPS readings of the streamers during the survey. In the marine seismic surface systems 10 of the present disclosure, however, obtaining GPS readings can prove difficult because the system 10 is significantly submerged below the water's surface so that GPS receivers cannot operate to obtain readings. Discussion now turns to several types of deployed or controllable device that can be used on the streamers to obtain GPS readings and otherwise control the position of the streamers during surveying.

1. Floating Deployed Device

In FIG. 18A, a marine seismic survey system 100 is shown having a first type of deployed device 80A according to the present disclosure. During a marine seismic survey, the locations of the streamers 60 are controlled and monitored so that the positions of the array of sensors 70 can be known for proper data acquisition and analysis. For example, GPS coordinates of the streamers' tail ends can be used to coordinate the position of each of the sensors 70 on the various streamers 60, and a control system 40 uses these coordinated positions for data acquisition, analysis, and control. A suitable system for acquisition, analysis, and control includes ION Geophysical's Intelligent Acquisition system that can determine the locations of the streamers 60. Such a system can steer the streamers 60 using DIGIFIN™ streamer steering systems and ORCA® command control software, which are available from ION Geophysical. (DIGIFIN is a registered trademark of ION Geophysical, Corporation, and ORCA is a registered trademark of Concept Systems Holdings Limited.)

In the present survey system 10C, the streamers 60 travel submerged below the water's surface using the skeg 50 and other features disclosed herein. Yet, it is still necessary to determine the locations of the streamers 60. To obtain the location of a given streamer 60, the system 10C in FIG. 18A uses the deployed device 80A that floats on the water's surface at the tail end of the streamer 60.

The deployed device 80A can be a spar type buoy designed to handle ice impacts and shed ice floes while at the surface. The device 80A includes a GPS receiver 82 that can obtain GPS coordinates for the deployed device 80A as it is towed behind the vessel 30 with the streamer 60. Obtaining the GPS coordinates can use conventional techniques known in the art so that they are not detailed herein. For example, details related to GPS-based positioning of an underwater streamer cable 60 can be found in U.S. Pat. No. 7,190,634, which is incorporated herein by reference.

As the vessel 30 tows the streamer 60, the source 90 produces source signals, and the sensors 70 detect seismic signals. The control system 40 obtains GPS coordinates from the deployed device 80A using the streamer 60 and other lines for communication and power to the GPS receiver 82. Then, using techniques known in the art, the control system 40 determines the location of streamer 60, sensors 70, source 90, and other components relative to the vessel 30 and physical coordinates of the area being surveyed.

Although the marine seismic survey system 10C of FIG. 18A uses the floating deployed device 80A, this is generally possible as long as the surfaced device 80A is designed to encounter a certain amount of ice floes, obstacle, or the like. Otherwise, the surfaced device 80A can become bogged with ice, damaged by impacts, moved out of place, or lost. Therefore, in some situations, a submersible form of deployed device may be used as described below.

2. Controllable Deployed Devices

As shown in FIG. 18B, the marine seismic survey system 10D has a controllable deployed device 80D whose depth can be controlled. During surveying, the deployed device 80D is towed on the end of the streamer 60 below the surface of the water to avoid impacts with ice floes. To obtain GPS readings, the deployed device 80D has a GPS receiver 82a that can be brought to the surface by controlling the depth of the device 80D. Therefore, the deployed device 80D is preferably towed below the surface in line with the streamer 60 and is brought to the surface to obtain GPS readings with the receiver 82*d* at appropriate times.

Figure 19A:
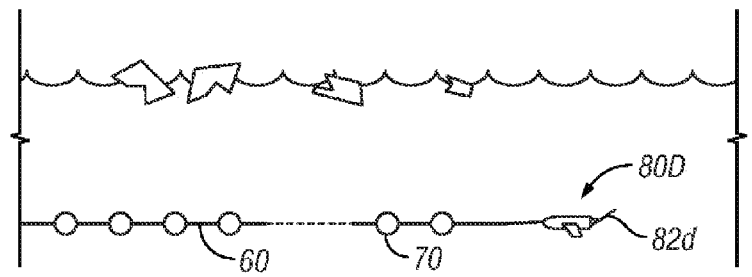
FIGS. 19A-19B illustrate one type of controllable device in two operating conditions.
Figure 19B:
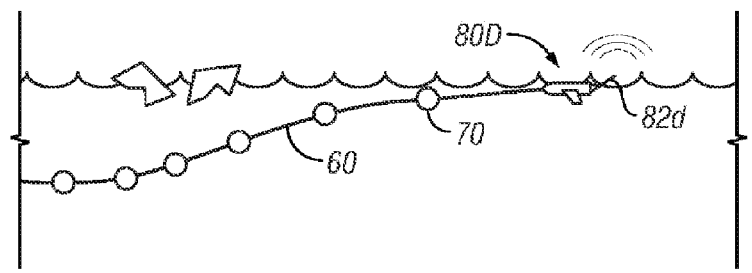

FIGS. 19A-19B illustrate the deployed device 80D in two operating conditions. In its standard gliding condition of FIG. 19A, the deployed device 80D follows behind the streamer 60 underwater. This position is suitable when ice floes, obstructions, or the like are at the surface of the water that can damage or obstruct the deployed device 80D. When a clearing develops at the surface, the deployed device 80D can be raised to the surface so that the GPS receiver 82*d* can obtain GPS readings. To map the array of streamers 60 and sensors 70 adequately, these GPS readings may need to be made at periodic intervals so the location of the streamers 60 and sensor 70 can be sufficiently tracked.

The deployed device 80D can be a controllable vehicle, device, or glider. In one arrangement, for example, the deployed device 80D can be a Remotely Operated Vehicle (ROV) having a propulsion system and controllable fins or the like to steer the deployed device 80D to desired positions in the water as it is towed. Alternatively, the deployed device 80D can be a towed glider that moves up or down using buoyancy control, as described in more detail latter. In yet another alternative, the deployed device 80D can be a Remotely Operated Towed Vehicle (ROTV) lacking a propulsion system but having controllable fins, as also described in more detail latter.

Figure 20A:
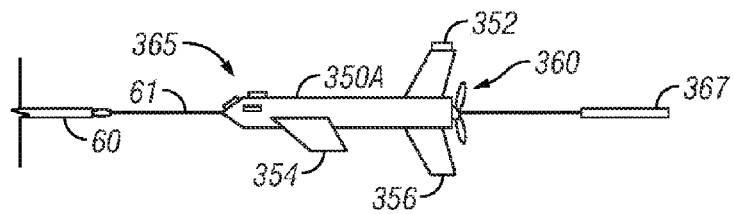
FIG. 20A illustrates an embodiment of a controllable device according to the present disclosure.

FIG. 20A illustrates an embodiment of a deployed device or controllable vehicle 350A for the disclosed marine seismic system. The vehicle 350A attaches to the end of the seismic streamer 60, which provides power and communications for the vehicle 350A. A tether 61 can be used for this purpose. Fins 354/356 on the vehicle 350A may be movable, and the vehicle 350A can have a propulsion system 360, such as a propeller. Alternatively, the fins 354/356 do not need to be movable. Instead, the vehicle 350A uses buoyancy control, as described below. Likewise, the vehicle 350A does not use propulsion, and the system 360 on the vehicle 350A may actually be a brake, as also described later.

As shown, the vehicle 350A has a detector 365 for detecting surface obstructions. This detector 365 can include sonar, ice profiler, optical sensor, multi-beam fathometer, camera, or the like that is upward looking and monitors for obstructions (or clearings) above the vehicle 350A. Signals from the detector 365 can be integrated with a navigation and/or control system (not shown) for acquiring marine seismic data, such as the Orca® system. In this way, the control system can determine when the surface above the vehicle 350A is free of ice and can signal the vehicle 350A to rise to the water's surface.

As one example, the detector 365 can use sonar to detect when ice is present at the surface. For example, if ice of a particular thicknesses is present at the surface, the sonar detector 365 may detect this surface ice, and this information can then be used for determining whether the vehicle 350A is raised or not. Although this depends on its capabilities, the sonar detector 365 is preferably able to detect thinner ice that is at least less than 1-m thick so the vehicle 350A can be protected from most surface ice that may be present.

As another example, the detector 365 can be an optical sensor that determines available light at the surface, which may indicate the presence or absence of ice. Along these lines, the detector 365 can be a digital camera that feeds video or images along the streamer 60 to the towing vessel.

The tail ends of the streamers 60 can lie a significant distance from the tow vessel, and operators will not be able to determine where the streamers 60 are and what ice may be over the vehicles 350A. Therefore, operators can view the video or images from the camera 365 and determine whether to raise a particular vehicle 350A or not if a clearing is present. This can then be done remotely by activating the vehicles 350A with signals communicated from the vessel to the vehicles 350A via the streamers 60.

The vehicle 350A also has a GPS receiver 352. As shown, this GPS receiver 352 can be located on an upward fin 354 so that the antenna 352 can peek above the surface of the water when the vehicle 350A glides to the surface for acquiring GPS readings. Regardless of how the GPS receiver 352 is surfaced, the GPS readings obtained are communicated to the instrument control system for positioning the streamer 60 and determining its location for proper data acquisition and analysis.

Because continuous GPS readings may not always be available, the vehicle 350A may include a compass or declinometer 367, which can be tethered from the end of the vehicle 350A to keep it away from any interfering electronics. The declinometer 367 can use a single-axis magnetometer to measure declination in the Earth's magnetic field, and the declination can then be corrected to a true north reading so the instrument control system can determine the position of the end of the streamer 60 in the absence of GPS readings usually used for that purpose.

The vehicle 350A intermittently gets GPS readings by going to the surface to obtain GPS data with the GPS receiver 352. Then, diving under the surface, the vehicle 350A can use the previously obtained GPS data along with inertial navigation data, compass readings, and current declinometer data to determine the real-time or near real-time location of the streamer 60 on an ongoing bases until new GPS readings can be obtained.

Figure 20B:
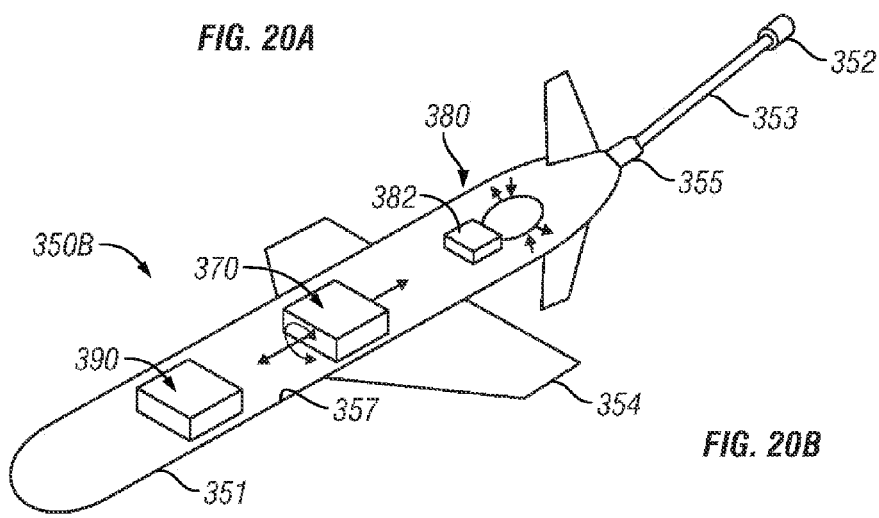
FIG. 20B illustrate inner details and components of the device of FIG. 20A.

FIG. 20B illustrates another deployed device or vehicle 350B and reveals some inner details and components. On the vehicle 350B, the fins 354 are not movable, and the vehicle 350B does not use propulsion. Instead, the vehicle 350B uses buoyancy control having a volume (e.g., bladder) 380 in a free-flooded tail of the vehicle 350B. The volume of this bladder 380 can be adjusted using a pumping system 382 or the like so that the buoyancy of the vehicle 350B can be altered in a controlled manner.

To change the pitch and roll of the vehicle 350B, a mass 370 can be shifted axially along the length of the vehicle 350B or rotated about an axis. Preferably, the mass 370 is the actual battery used for the vehicle's electronic components, which include servos or other motors for moving the mass 370.

In contrast to the GPS receiver of FIG. 20A, the GPS receiver 352 shown in FIG. 20B is located on the end of an extended arm or mast 353. This arm 353 can extend upward at an angle from the vehicle 350B so that the GPS receiver 352 can extend from out of the water when the vehicle 350B glides near the surface. Alternatively, the mast 353 can be pivoted at its base 355 from a streamlined position in line with the vehicle 350B to an upward angled position. When the vehicle 350B is periodically brought to the surface to obtain GPS data, the mast 353 can be activated to pivot the GPS receiver 352 out of the water at this base 355.

In general, the vehicle 350B can have features similar to those used for vehicles and drifting profilers that measure subsurface currents, temperatures, and the like in the oceans. As such, the vehicle 350B has a chassis (not shown) holding the variable buoyancy system 380, mass 370, and electronics section 390. An isopycnal hull 357 suitable for the density of seawater can fit in sections on the chassis. The hull 357 and chassis can then fit within a fiberglass housing 351 having the fins 354 and streamlined shape. The mast 353 for the GPS receiver 352 can connect to the electronics section 390 and can extend from the housing 351.

F. Deployment Arrangements for Systems

Because the towing vessel 30 tows the seismic array in icy or obstructed waters, deployment of the seismic survey components preferably accounts for possible issues with ice floes and the like that can hinder the deployment and retrieval of the streamers 60 and sources 90. As noted previously (specifically with reference to FIGS. 4A-4C), deployment and retrieval of the system may be performed when the towing vessel 30 is away from significant ice. For example, the seismic system can be deployed normally before putting cables into the skeg 50 and submerging the various components.

In a typical implementation, the streamers 60 can be several kilometers in length, and deploying the seismic system in a clearing may require a significant area that may not always be available in icy regions. Therefore, it is desirable to be able to deploy/retrieve the disclosed seismic systems in other areas of an icy region, including those having ice.

a. First Form of Seismic Array

Figure 21A:
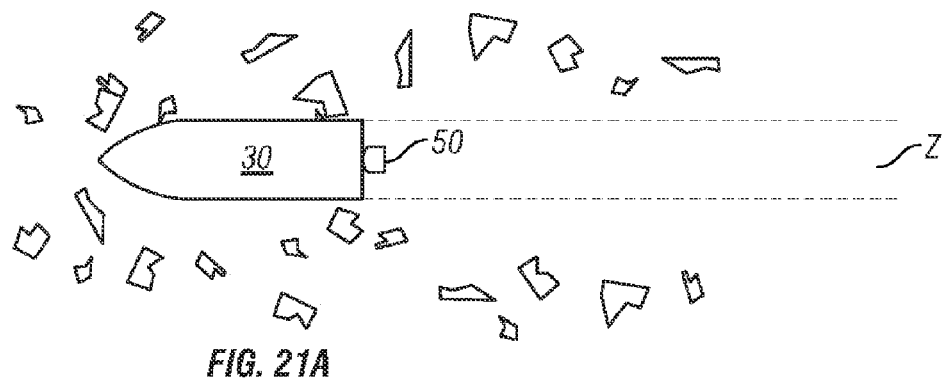
FIG. 21A shows a plan view of a seismic vessel with a skeg and a deployment zone behind a vessel.

For reference, FIG. 21A shows a tow vessel 30 traveling through an icy region that is not entirely clear of ice. The vessel 30 has a skeg 50 from which one or more sources and streamers can be towed. The vessel 30 may break the ice and/or push ice floes out of the way as it travels so that a narrow deployment area Z lies in its wake where ice may be relatively absent. Of course, this depends on how tightly the ice is packed and how it might be traveling.

When conditions permit, it is preferred to be able to deploy and retrieve the streamers 60 of an array in such a cleared area Z. Therefore, the deployment and retrieval techniques for surveying in icy waters preferably take advantage of this potentially cleared area Z. The examples below discuss several forms of seismic arrays that can be deployed and retrieved in such an area Z.

Figure 21B:
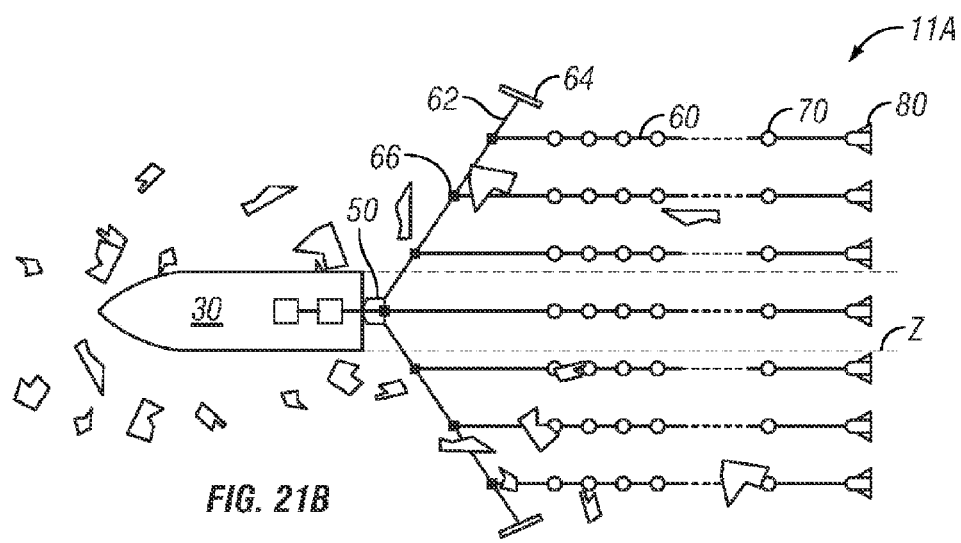
FIGS. 21B-21E shows the seismic vessel with various forms of seismic arrays deployed.

In FIG. 21B, a first form of seismic array 11A uses direct towlines 62 from the skeg 50. These lines 62 are deployed with paravanes 64 on the end. Then, streamers 60 having sensors 70 and deployed devices 80 can be deployed in the water in the cleared area Z and then coupled to the direct towlines 62 using a coupling 66, such as a ball joint. This arrangement can allow several streamers 60 to be deployed separately in the shadow of the vessel 30 and individually coupled to the towlines 62.

b. Paravanes for Array

Figure 22A:
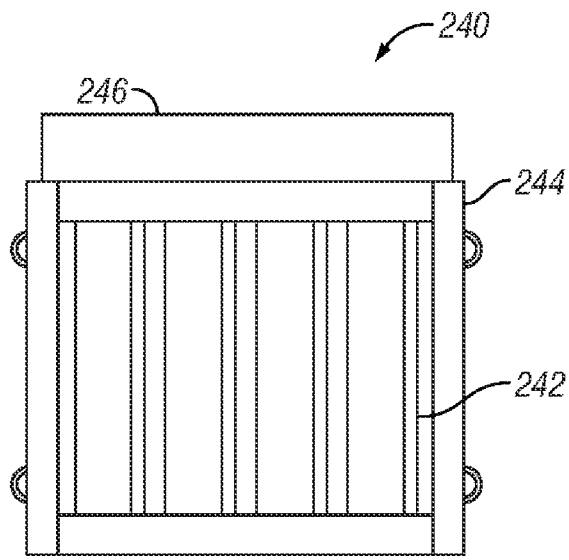
FIGS. 22A-22B show a buoyant paravane for a marine seismic survey system according to the present disclosure.

For reference, FIG. 22A shows an example of a paravane 240 that can be used with the disclosed system to support streamers or a seismic source. This paravane 240 has a frame 244 holding one or more louvers or vanes 242 intended to engage the water when towed therein. Because the paravane 240 support streamers (60) towed below the surface of the water, the paravane 240 is preferably neutrally buoyant. Accordingly, the paravane 240 can have a buoyancy element or float 246 disposed thereon or connected thereto that is intended to make the paravane 240 neutrally buoyant at a predetermined depth. Additionally, the paravane 240 may have controllable wings (not shown) as disclosed elsewhere herein to control the depth of the paravane 240 when being towed.

In one example, this buoyancy element 246 may be filled with a foam or the like so that the element's buoyancy can be set for a particular depth before being deployed. In fact, the adjustable buoyance for the element 246 can use components similar to the adjustable buoyancy float disclosed above with reference to FIGS. 17A-17D.

Figure 22B:
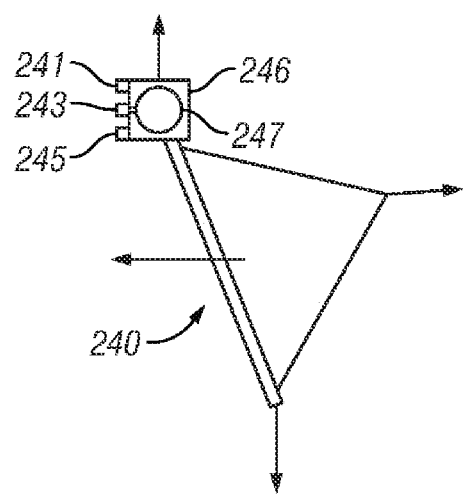

Alternatively, in addition to any foam, the buoyancy element 246 can contain a fillable volume (e.g., bladder or chamber) as disclosed herein to configure its buoyancy and control its depth. In FIG. 22B, for example, the dynamics of a paravane 240 having a buoyancy element 246 are diagrammatically illustrated. As expected, the paravane 240 acts as a wing or door in the water. Gravity acts to pull the paravane 240 to greater depths, the passing water acts against the surface of the paravane 240, and the towlines pull the paravane 240 against the water. Finally, the buoyancy element 246 acts to maintain the paravane 240 at a desired depth in the water. At the same time, the arrangement of the paravane's geometry and the applicable forces must be handled so that the paravane 240 remains stable in the water when being towed and does not twist and turn due to torque.

To maintain depth and stability, the buoyancy element 246 can include a depth sensor 241, a controller 245, and a buoyancy chamber 247. In response to changes in the depth beyond a desired level detected by the depth sensor 241, the controller 245 can adjust the buoyancy of the chamber 247 to alter the paravane's depth. For example, the controller 245 can operate a valve or pump 243 and can flood or evacuate water in the chamber 247 filled with air. In fact, the buoyancy element 246 for the paravane 240 can use depth control components similar to the depth controlled float discussed above with reference to FIGS. 12A through 16C.

c. Second Form of Seismic Array

Figure 21C:
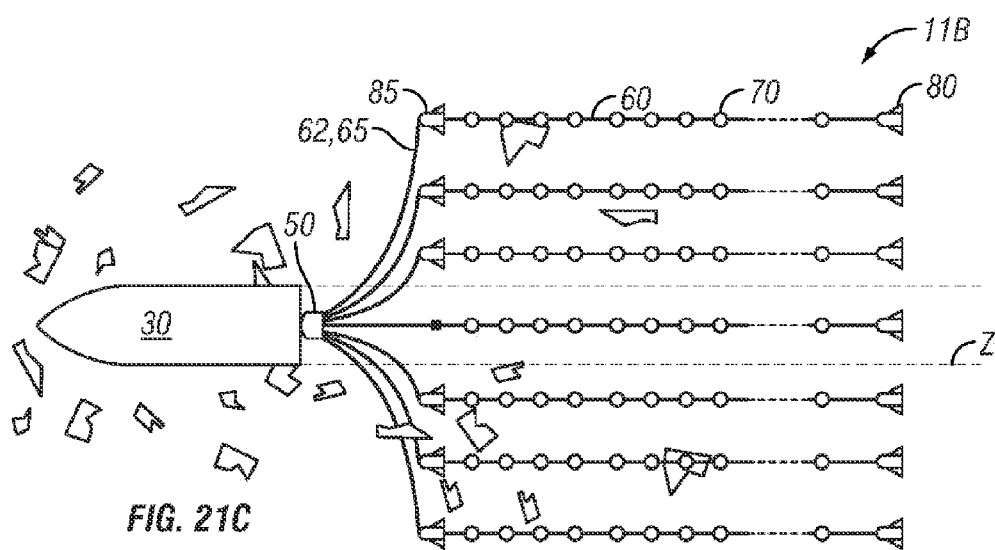

In FIG. 21C, a second form of seismic array 11B uses multiple controllable vehicles 80/85 and streamers 60 with sensors 70. To achieve three-dimensional operation, each of the leading vehicles 85 individually tows a streamer 60. Towlines and streamer cables 65 connect the leading vehicles 85 to the vessel 30. The position and depth of each vehicle 80/85 is controlled to maintain an appropriately arranged array of streamers 60 for the seismic survey. In addition, the controlled depth allows the streamers 60 to avoid any ice floes at the surface. In general, each vehicle 80/85 can be an autonomous underwater vehicles (AUVs), a remotely operated vehicle (ROV), a remotely operated towed vehicle (ROTV), or some other suitable vehicle depending on the implementation. If the leading vehicles 85 are strictly autonomous underwater vehicles (AUVs), then they may not be attached to the vessel 30 by a towline or tether.

Being independent of one another, the vehicles 85 also facilitate deployment and retrieval of the streamers 60 during operation. For example, an individual vehicle 85 can guide its streamer 60 down under the other streamers 60 and can bring it up through the middle of the array of streamers 60 in the potentially cleared area Z. The vehicle 85 can then pull its steamer 60 up to the vessel 30 and avoid the other streamers 60 and towlines and cables 62/65. This will allow operators to deploy and retrieve the streamers 60 individually and can even allow for repair of a steamer 60 while all of the other streamers 60 remain in the water. Using the vehicles 85 is also beneficial in icy waters, because the vehicles 85 allow the towlines 62 to be less taut than conventionally done, and the less taut lines 62 in the icy waters are better suited to handle potential impacts with ice during operation.

d. Additional Forms of Seismic Array

Figure 21D:
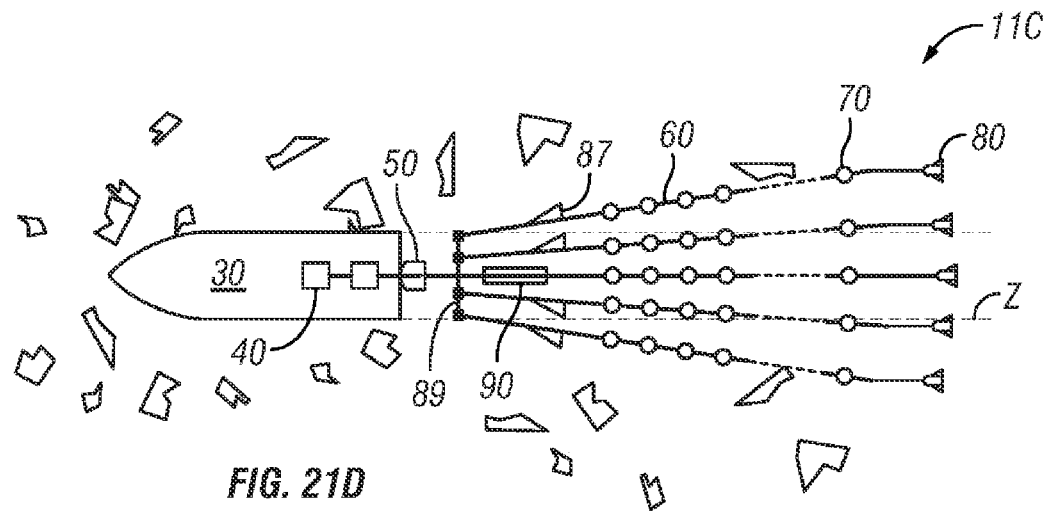
Figure 21E:
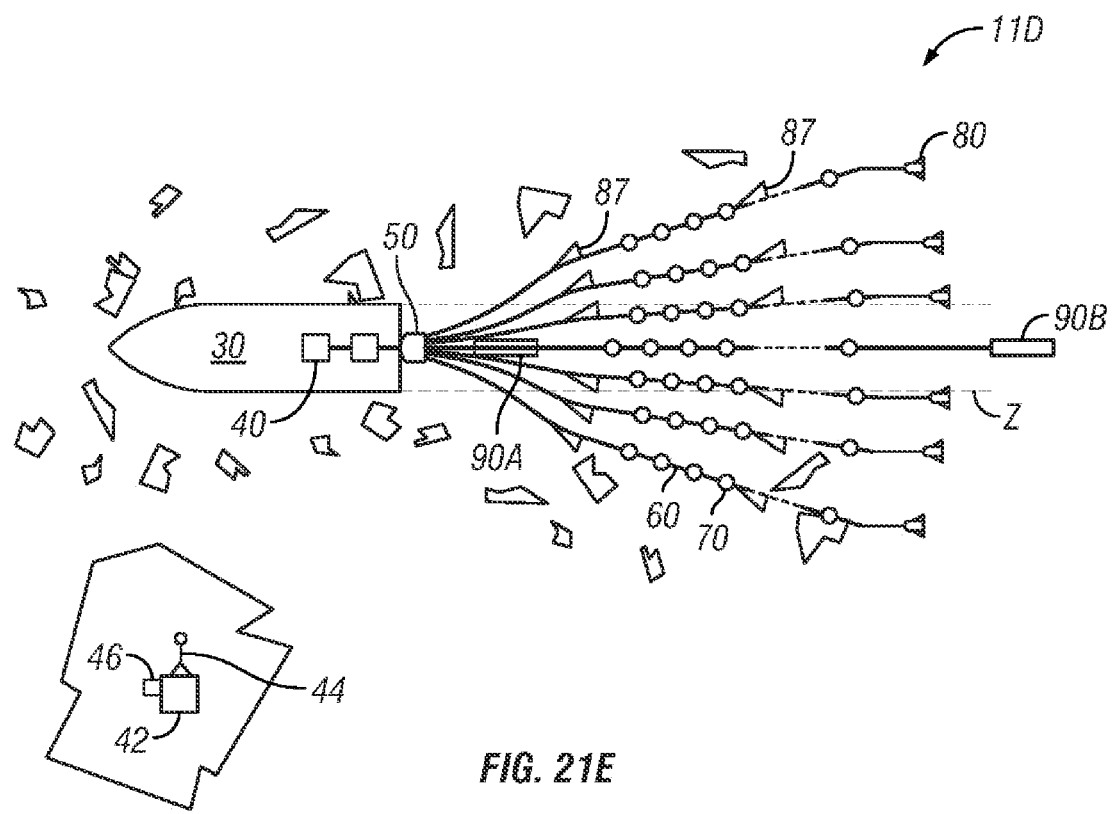

FIGS. 21D and 21E show additional forms of seismic arrays 11C and 11D that use a splayed arrangement of the streamers 60. In FIG. 21D, a cross arm 89 is deployed underwater from the skeg 50 in the shadow of the vessel 30, and several streamers 60 couple to the cross arm 89 using appropriate couplings. These steamers 60 can then splay outward from the cross arm 89 using one or more controllable fins or wings 87 disposed along their length.

In FIG. 21E, each of the streamers 60 deploy individually from the skeg 50 so that they deploy underwater and in the shadow of the vessel 30. As before, these steamers 60 can splay outward from the skeg 50 using one or more controllable fins or wings 87 disposed along their length.

e. Controllable Fin for Array

Figure 22C:
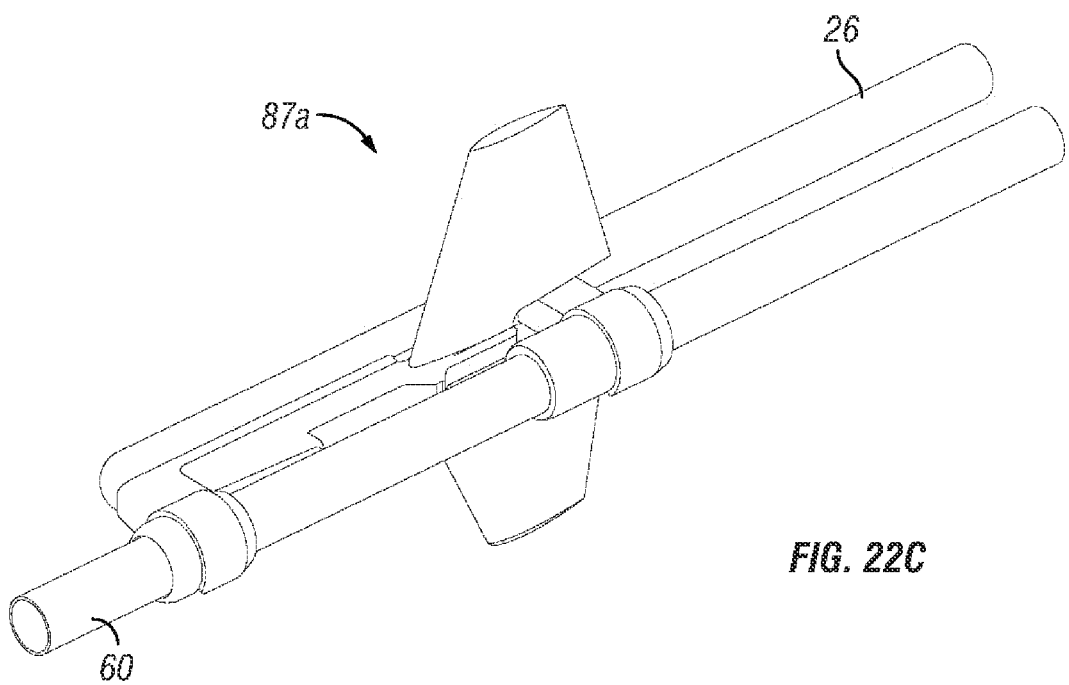
FIG. 22C shows a perspective view of a controllable fin for a streamer of a marine seismic survey system according to the present disclosure.
Figure 22D:
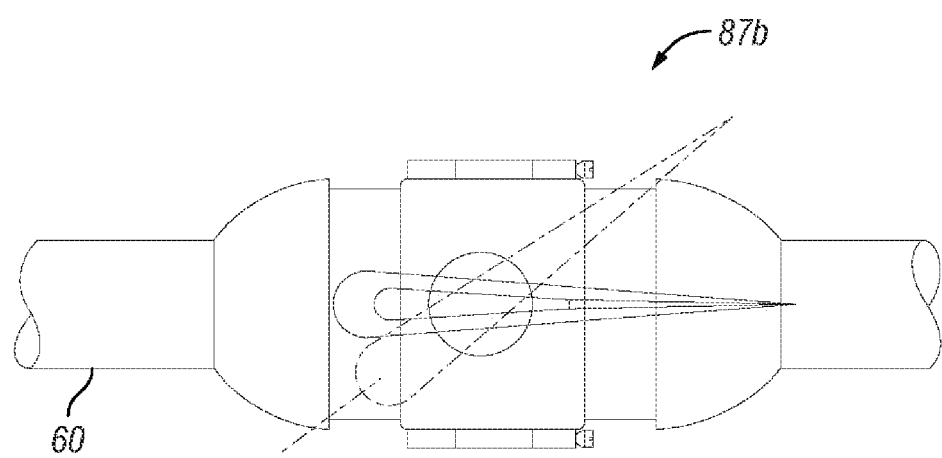
FIG. 22D shows a side view of a controllable wing for a streamer of a marine seismic survey system according to the present disclosure.

For reference, FIG. 22C shows a perspective view of a controllable fin 87a that can be used to steer a streamer 60 (i.e., control the lateral position of the streamer 60). In addition, FIG. 22D shows a side view of a controllable wing 87b that can be used to control the depth (i.e., vertical position) of a streamer 60. Details of such devices having fins or wings deployable on a cable for controlling the lateral or vertical position of a streamer cable can be found in U.S. Pat. Nos. 6,525,992; 7,092,315; 7,206,254; and 7,423,929, which are each incorporated herein by reference.

For example, these controllable fins or wings 87 in the systems of FIGS. 21D-21E can be DIGIFIN™ streamer steering systems available from ION Geophysical to steer the streamers. They can also be DIGIBIRD™ streamer steering systems available from ION Geophysical to control the depth of the towed streamers. (DIGIBIRD is registered trademarks of ION Geophysical Corporation.)

Control of the fins or wings 87 and determination of the location of the sensors 70 can be performed using the control system 40 and available software. Other devices that can also be used include the Compass Bird streamer systems available from ION Geophysical for providing compass heading information and depth measurement and control. Moreover, the control system 40 and available software can control the various fins and wings 87 to avoid ice bergs or large chunks of ice that may happen to travel at the surface over the array of streamers 60 and potentially has a depth sufficient to damage the submerged streamers 60.

Although one skeg 50 is shown in the arrangements of FIGS. 21A-21E, it is possible for a vessel to use multiple skegs 50 on the vessel 30 to deploy streamers 60. Using the multiple skegs 50 can help in the deployment and retrieval of the streamers 60 by dividing them up in their arrangement.

Although the arrangements in FIGS. 21B-21D and elsewhere show a single source, multiple sources could be used. For example, FIG. 21E shows one source 90A in a conventional location towed behind the vessel 30. In addition, another source 90B is towed behind the splayed array of the steamers 60. This second source 90B can be used to obtain a reverse reading from the steamers 60, which can be advantageous for data acquisition and analysis.

G. Control and Position System

The systems in FIGS. 21A-21E and those disclosed elsewhere herein use a control system 40 that can use conventional features for marine seismic surveying. For example, the control system 40 can control lateral steering of the streamers 60 using streamer technology currently available for conventional marine seismic surveying in non-icy waters. For icy regions, the control system 40 can be integrated with additional features for handling information related to icy waters. For example, the control system 40 can be integrated with information from satellite imagery, nautical charts, weather forecasting, and other information to predict thickness of ice for a survey region and to find clearings in the ice in given areas.

Satellite images can be limited, and ice floes and locations of ice bergs, chunks, and other obstructions can change over time. Therefore, it would be helpful to keep track of the position of particular obstructions and determine how they are moving and how their movements may hinder the survey being conducted. Accordingly, the control system 40 can also use separate position sensors that are placed on ice bergs or other floating obstructions that could threaten the steamer array during the seismic survey.

As shown for example in FIG. 21E, the positions sensors 42 can be battery operated and can have a GPS receiver 44 and a communication interface 46. When located on an obstruction, the position sensor 42 can broadcast information about its location. For example, as the ice breaker vessel (not shown) breaks ice ahead of the surveying vessel 30, operators may place these separate position sensors 42 on particularly large or deep ice chunks or bergs. Then, using an appropriate communication link with the separate position sensor 42, the control system 40 can track the movements of the obstruction.

Its movement may be immediately tracked to determine if it will interfere with the array of streamers 60 currently being towed by the seismic vessel 30. If that is the case, the steamers 60 can be steered away or to a greater depth for protection. In addition, the movement of the obstructions can be tracked over time so the control system 40 can know the location of the obstructions when the streamers 60 are towed back over the area when mapping. Depending on whether the obstruction has moved into the proposed path of the survey, operators can alter the course of the seismic vessel 30 to avoid the obstruction's known position.

The foregoing description of preferred and other embodiments is not intended to limit or restrict the scope or applicability of the inventive concepts conceived of by the Applicants. The teachings of the present disclosure can apply to 2-D, 3-D, and 4-D seismic surveying in icy or obstructed waters, as well under normal marine seismic conditions. In fact, the teachings of the present disclosure can be used in any environment—not just those prone to physical obstructions or obstacles. For example, weather, large swells, noise, any conventional hazards, and even normal conditions encountered in marine seismic surveys can benefit from the systems of the present disclosure.

Moreover, aspects and techniques discussed in conjunction with one particular embodiment, implementation, or arrangement disclosed herein can be used or combined with aspect and techniques discussed in others disclosed herein. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A marine surveying apparatus for a vessel having a pneumatic fluid source of pneumatic fluid, the apparatus comprising:
at least one towed component towed by the vessel and submerged below the surface of the water;
a set of floats submerged below the surface of the water and supporting the at least one towed component, the set of floats including:
a first float in communication with the pneumatic fluid source of the vessel via a line, the first float having buoyancy controlled with the pneumatic fluid of the vessel and actively controlling depth of the at least one towed component in the water; and a second float having a body with a hollow and having a preconfigured buoyancy being configured with one or more buoyant inserts and one or more neutral spacers disposed in the hollow.

2. The apparatus of claim 1, wherein the at least one towed component is selected from the group consisting of a seismic source, an air gun array, an electromagnetic source, a magnetic source, a sonar device, a sound generating device, a paravane, an acoustic device, an imaging device, and a streamer.

3. The apparatus of claim 1, wherein the first float comprises a volume fillable with the pneumatic fluid from the pneumatic fluid source for buoyancy control.

4. The apparatus of claim 3, comprising:
a fill valve communicating the pneumatic fluid source with the volume and controlling filling of the volume with the pneumatic fluid; and
an exhaust valve communicating with the volume and controlling release of the pneumatic fluid from the volume.

5. A marine surveying apparatus for a vessel having a pneumatic fluid source of pneumatic fluid, the apparatus comprising:
at least one towed component towed by the vessel and submerged below the surface of the water;
a set of floats submerged below the surface of the water and supporting the at least one towed component, the set of floats including:
a first float in communication with the pneumatic fluid source of the vessel via a line, the first float having buoyancy controlled with the pneumatic fluid of the vessel and actively controlling depth of the at least one towed component in the water, wherein the first float comprises: a chamber having a volume fillable with the pneumatic fluid from the pneumatic fluid source for buoyancy control; a housing disposed about the chamber and having first and second ends; and first and second end caps affixed to the first and second ends of the housing and enclosing the chamber therein; and
a second float having a preconfigured buoyancy.

6. The apparatus of claim 5, wherein the housing and the end caps each comprise a shell disposed outside of a buoyant material.

7. The apparatus of claim 4, wherein the fill valve comprises a control valve operable to open and close communication of the pneumatic fluid source to the volume.

8. The apparatus of claim 7, wherein the fill valve comprises a first solenoid actuating the control valve.

9. A marine surveying apparatus for a vessel having a pneumatic fluid source of pneumatic fluid, the apparatus comprising:
at least one towed component towed by the vessel and submerged below the surface of the water;
a set of floats submerged below the surface of the water and supporting the at least one towed component, the set of floats including:
a first float in communication with the pneumatic fluid source of the vessel via a line, the first float having buoyancy controlled with the pneumatic fluid of the vessel and actively controlling depth of the at least one towed component in the water, wherein the first float comprises: a volume fillable with the pneumatic fluid from the pneumatic fluid source for buoyancy control, a fill control valve operable to open and close communication of the pneumatic fluid source to the volume, and an exhaust control valve operable between first and second conditions, the exhaust control valve in the first condition communicating the pneumatic fluid source to a piston valve to seal the volume, the exhaust control valve in the second condition communicating the pneumatic fluid source to the piston valve to unseal the volume; and
a second float having a preconfigured buoyancy.

10. The apparatus of claim 9, wherein the exhaust control valve comprises a second solenoid actuating the exhaust control valve.

11. The apparatus of claim 9, wherein the piston valve comprises:
a seal disposed at an exhaust port of the volume; and
a piston movable in response to the pneumatic fluid supplied by the exhaust control valve,
wherein in the first condition, the piston closes the seal against the exhaust port, and
wherein in the second condition, the piston releases the seal from the exhaust port.

12. The apparatus of claim 3, wherein the volume has one or more water ports passing water out of the volume as the volume fills with the pneumatic fluid from the pneumatic fluid source and passing water into the volume as the volume releases the pneumatic fluid from the volume.

13. A marine surveying apparatus for a vessel having a pneumatic fluid source of pneumatic fluid, the apparatus comprising:
at least one towed component towed by the vessel and submerged below the surface of the water;
a set of floats submerged below the surface of the water and supporting the at least one towed component, the set of floats including:
a first float in communication with the pneumatic fluid source of the vessel via a line, the first float having buoyancy controlled with the pneumatic fluid of the vessel and actively controlling depth of the at least one towed component in the water, the first float comprising a volume fillable with the pneumatic fluid from the pneumatic fluid source for buoyancy control, the volume having first and second water ports, the first float comprising first and second valves and a weight, the first and second valves being normally open and allowing passage of water into and out of the volume respectively through the first and second water ports, the weight having a pendulum connection to the first and second valves, the weight closing the first valve when the first float tilts in a first direction and closing the second valve when the first float tilts in a second direction; and
a second float having a preconfigured buoyancy.

14. The apparatus of claim 1, wherein the first float comprises a depth sensor providing a depth signal indicative of the depth of the at least one towed component and being used in controlling the buoyancy of the first float.

15. The apparatus of claim 1, further comprising a controller controlling the buoyance of the first float with the pneumatic fluid source.

16. The apparatus of claim 15, wherein the controller is disposed on the first float.

17. The apparatus of claim 1, wherein the second float is connected in line to the first float.

18. The apparatus of claim 17, wherein a flexible connection connects the second float in line to the first float.

19. The apparatus of claim 5, wherein the second float comprises:

a body defining a hollow; and
one or more buoyant inserts disposed in the hollow and configuring the buoyancy of the second float.

20. The apparatus of claim 19, further comprising one or more spacers being neutral and disposed in the hollow.

21. The apparatus of claim 1, wherein the body comprises:
a housing having the hollow defined therethrough between first and second ends; and
first and second end caps affixed to the first and second ends of the housing and enclosing the hollow.

22. The apparatus of claim 21, wherein the housing and the end caps each comprise a shell disposed outside of a buoyant material.

23. The apparatus of claim 1, wherein the at least one towed component comprises an air gun array in communication with the pneumatic fluid source having pressurized air as the pneumatic fluid.

24. The apparatus of claim 23, comprising a pressure regulator in communication with the pneumatic fluid source and regulating pressure of the pressurized air to the first float.

25. The apparatus of claim 1, wherein the at least one towed component comprises a streamer towed by the vessel and supported by the set of floats, the streamer having one or more sensors for sensing a signal.

26. The apparatus of claim 1, wherein the at least one towed component comprises a paravane towed by the vessel and supported by the set of floats, the paravane coupled to one or more additional towed components.

27. A floatation device for a component towed in water by a vessel, the vessel having a pneumatic fluid source, the device comprising: a float defining a chamber with at least two water ports, the float submerged below the surface of the water and supporting the towed component;
a fill valve connected via a line to the pneumatic fluid source of the vessel and communicating the pneumatic fluid source with the chamber;
an exhaust valve communicating the chamber outside the float;
a controller receiving a depth signal associated with the towed component, the controller controlling buoyance of the float with the fill valve and the exhaust valve based on the depth signal and controlling depth of the towed component in the water based on the controlled buoyancy;
a pair of normally open valves in communication with the water ports of the chamber and allowing passage of water into and out of the chamber; and
a pendulum weight connected to the pair of normally open valves, the pendulum weight closing an upended one of the water ports in response to tilting of the float.

28. The apparatus of claim 26, wherein the paravane comprises: a deflector connected to the vessel and supporting the one or more additional towed components, the deflector submerged below the surface of the water and deflecting the one or more additional towed components; and wherein the first float has a chamber and comprises:
a fill valve connected via the line to the pneumatic fluid source of the vessel and communicating the pneumatic fluid source of the vessel with the chamber;
an exhaust valve communicating the chamber outside the float; and
a controller receiving a depth signal associated with the deflector, the controller controlling buoyance of the first float with the fill valve and the exhaust valve based on the depth signal and controlling depth of the deflector in the water based on the controlled buoyancy of the first float.

29. The apparatus of claim 1, wherein the first float defines a chamber and comprises:
a fill valve connected via the line to the pneumatic fluid source of the vessel and communicating the pneumatic fluid source of the vessel with the chamber;
an exhaust valve communicating the chamber outside the first float;
a controller receiving a depth signal associated with the at least one towed component, the controller controlling buoyance of the first float with the fill valve and the exhaust valve based on the depth signal.

30. A method of marine seismic surveying with a vessel having a pneumatic fluid source, the method comprising:
towing, with the vessel, at least one towed component submerged below the surface of the water;
supporting at least a first portion of the at least one towed component with at least one first float submerged below the surface of the water and having a controllable buoyancy;
supporting at least a second portion of the at least one towed component with at least one second float submerged below the surface of the water, the at least one second float having a body with a hollow and having a configured buoyancy being configured with one or more buoyant inserts and one or more neutral spacers disposed in the hollow; and
controlling depth of the at least one towed component in the water by actively controlling the controllable buoyancy of the at least one first float with the pneumatic fluid source of the vessel via a line connected to the at least one first float.

* * * * *